United States Patent
Chu et al.

(10) Patent No.: US 10,849,024 B2
(45) Date of Patent: Nov. 24, 2020

(54) WIFI OPERATION WITH CHANNEL AGGREGATION

(71) Applicant: NXP USA, Inc., Austin, TX (US)

(72) Inventors: Liwen Chu, San Ramon, CA (US);
Hongyuan Zhang, Fremont, CA (US);
Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 21 days.

(21) Appl. No.: 16/179,647

(22) Filed: Nov. 2, 2018

(65) Prior Publication Data

US 2019/0182863 A1 Jun. 13, 2019

Related U.S. Application Data

(60) Provisional application No. 62/596,637, filed on Dec. 8, 2017.

(51) Int. Cl.
*H04W 28/20* (2009.01)
*H04W 72/04* (2009.01)
(Continued)

(52) U.S. Cl.
CPC .......... *H04W 28/20* (2013.01); *H04W 24/08* (2013.01); *H04W 72/04* (2013.01); *H04W 74/08* (2013.01); *H04W 76/00* (2013.01); *H04W 84/12* (2013.01)

(58) Field of Classification Search
CPC ..... H04W 24/08; H04W 28/20; H04W 72/04; H04W 74/08; H04W 76/00
See application file for complete search history.

(56) References Cited

U.S. PATENT DOCUMENTS

| 8,773,969 | B1 | 7/2014 | Zhang et al. |
| 8,787,385 | B2 | 7/2014 | Liu et al. |

(Continued)

FOREIGN PATENT DOCUMENTS

| EP | 2028809 | A2 | 2/2009 |
| EP | 2999252 | | 3/2016 |

(Continued)

OTHER PUBLICATIONS

U.S. Appl. No. 16/162,113, Zhang et al., "WiFi Channel Aggregation," filed Oct. 16, 2018.

(Continued)

*Primary Examiner* — Walli Z Butt
*Assistant Examiner* — Ryan C Kavleski

(57) ABSTRACT

A communication device sets a first channel access timer to a first duration in which at least a first portion of a communication channel is expected to be busy, the first timer corresponding to a first one of a plurality of component channels of the communication channel. The communication device also sets a second channel access timer to a second duration in which at least a second portion of the communication channel is expected to be busy, the second timer corresponding to a second one of the plurality of component channels. The communication device counts down the first timer and the second timer. When at least one of the first timer and the second timer reaches zero, the communication device determines whether one or more of the component channels are idle, and transmits at least one signal in at least one of the component channels determined to be idle.

17 Claims, 8 Drawing Sheets

(51) Int. Cl.
- *H04W 76/00* (2018.01)
- *H04W 24/08* (2009.01)
- *H04W 74/08* (2009.01)
- *H04W 84/12* (2009.01)

(56) References Cited

U.S. PATENT DOCUMENTS

| | | |
|---|---|---|
| 10,257,806 B2 | 4/2019 | Chu et al. |
| 10,349,413 B2 | 7/2019 | Zhang et al. |
| 2010/0322141 A1 | 12/2010 | Liu et al. |
| 2011/0096747 A1* | 4/2011 | Seok ............... H04W 74/002 370/329 |
| 2011/0249659 A1 | 10/2011 | Fontaine et al. |
| 2016/0212748 A1 | 7/2016 | Yang et al. |
| 2017/0149547 A1 | 5/2017 | Kim et al. |
| 2017/0181136 A1 | 6/2017 | Bharadwaj et al. |
| 2017/0257888 A1* | 9/2017 | Kneckt ............ H04W 74/0816 |
| 2017/0302422 A1* | 10/2017 | Chu .................... H04L 5/0007 |
| 2017/0311204 A1 | 10/2017 | Cariou et al. |
| 2017/0325178 A1 | 11/2017 | Verma et al. |
| 2017/0338935 A1 | 11/2017 | Ahn et al. |
| 2017/0295571 A1 | 12/2017 | Chu et al. |
| 2017/0366329 A1 | 12/2017 | Cao et al. |
| 2018/0115403 A1 | 4/2018 | Sakai et al. |
| 2018/0302858 A1 | 10/2018 | Son et al. |
| 2019/0082461 A1 | 3/2019 | Guo et al. |
| 2019/0123863 A1 | 4/2019 | Zhang et al. |
| 2019/0182714 A1 | 6/2019 | Chu et al. |
| 2019/0182863 A1 | 6/2019 | Chu et al. |
| 2019/0289576 A1* | 9/2019 | Park ................. H04W 74/0808 |
| 2019/0349930 A1 | 11/2019 | Chu et al. |

FOREIGN PATENT DOCUMENTS

| | | |
|---|---|---|
| GB | 2501898 A | 11/2013 |
| WO | WO-2006/000955 | 1/2006 |
| WO | WO-2012/026779 A2 | 3/2012 |
| WO | WO-2015/099803 | 7/2015 |
| WO | WO-2017/026937 | 2/2017 |
| WO | WO-2017/111567 A2 | 6/2017 |

OTHER PUBLICATIONS

U.S. Appl. No. 16/179,634, Chu et al., "WiFi Operation with Channel Aggregation," filed Nov. 2, 2018.

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, the Institute of Electrical and Electronics Engineers, Inc., 3774 pages (Aug. 2016).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-425 (Dec. 18, 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

International Search Report and Written Opinion in International Patent Application No. PCT/US2018/059027, dated Jan. 23, 2019 (14 pages).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

Chen et al., "TGaj Complete Proposal (60GHz)," IEEE Draft 802.11-13/1301r2, vol. 802.11aj, No. 2, 34 pages (Jan. 8, 2014).

Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).

Notice of Allowance; U.S. Appl. No. 16/179,634; 8 pages (dated Jun. 8, 2020).

Zhang et al; "EHT Technology Candidate Discussions"; doc: IEEE 802.11-18/1161r0; The Institute of Electrical and Electronics Engineers, Inc.; pp. 1-10 (Jul. 8, 2018).

Notice of Allowance dated Jul. 16, 2020 in U.S. Appl. No. 16/179,634.

* cited by examiner

WIFI OPERATION WITH CHANNEL AGGREGATION

CROSS REFERENCES TO RELATED APPLICATIONS

This application claims the benefit of U.S. Provisional Patent Application No. 62/596,637, entitled "MAC Support of WiFi Channel Aggregation," filed on Dec. 8, 2017, which is hereby incorporated herein by reference in its entirety.

FIELD OF TECHNOLOGY

The present disclosure relates generally to wireless communication systems, and more particularly to media access channel (MAC) support for data transmission and reception over multiple communication channels.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method for protecting transmissions in a communication channel includes: setting, at a communication device, a first channel access timer to a first duration in which at least a first portion of the communication channel is expected to be busy, wherein the first channel access timer corresponds to a first component channel of a plurality of component channels of the communication channel; setting, at the communication device, a second channel access timer to a second duration in which at least a second portion of the communication channel is expected to be busy, wherein the second channel access timer corresponds to a second component channel of the plurality of component channels of the communication channel; counting down, with the communication device, the first channel access timer and the second channel access timer; and when at least one of the first channel access timer and the second channel access timer reaches zero, determining, with the communication device, whether one or more component channels of the plurality of component channels the communication channel are idle; and in response to determining one or more component channels to be idle, transmitting, with the communication device in at least one of the one or more component channels determined to be idle, at least one signal to at least one other communication device.

In another embodiment, a communication device comprises: a network interface device implemented on one or more integrated circuits configured to set a first channel access timer to a first duration in which at least a first portion of a communication channel is expected to be busy, wherein the first channel access timer corresponds to a first component channel of a plurality of component channels of the communication channel; set a second channel access timer to a second duration in which at least a second portion of the communication channel is expected to be busy, wherein the second channel access timer corresponds to a second component channel of the plurality of component channels of the communication channel; count down the first channel access timer and the second channel access timer; when at least one of the first channel access timer and the second channel access timer reaches zero, determine whether one or more component channels of the plurality of component channels the communication channel are idle; and in response to determining one or more component channels to be idle, cause at least one signal to be transmitted, in at least one of the one or more component channels determined to be idle, to at least one other communication device.

DETAILED DESCRIPTION

Multi-channel communication techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, multi-channel communication techniques are utilized in other types of wireless communication systems such as personal area networks (PANs), mobile communication networks such as cellular networks, metropolitan area networks (MANs), satellite communication networks, etc.

Figure 1:
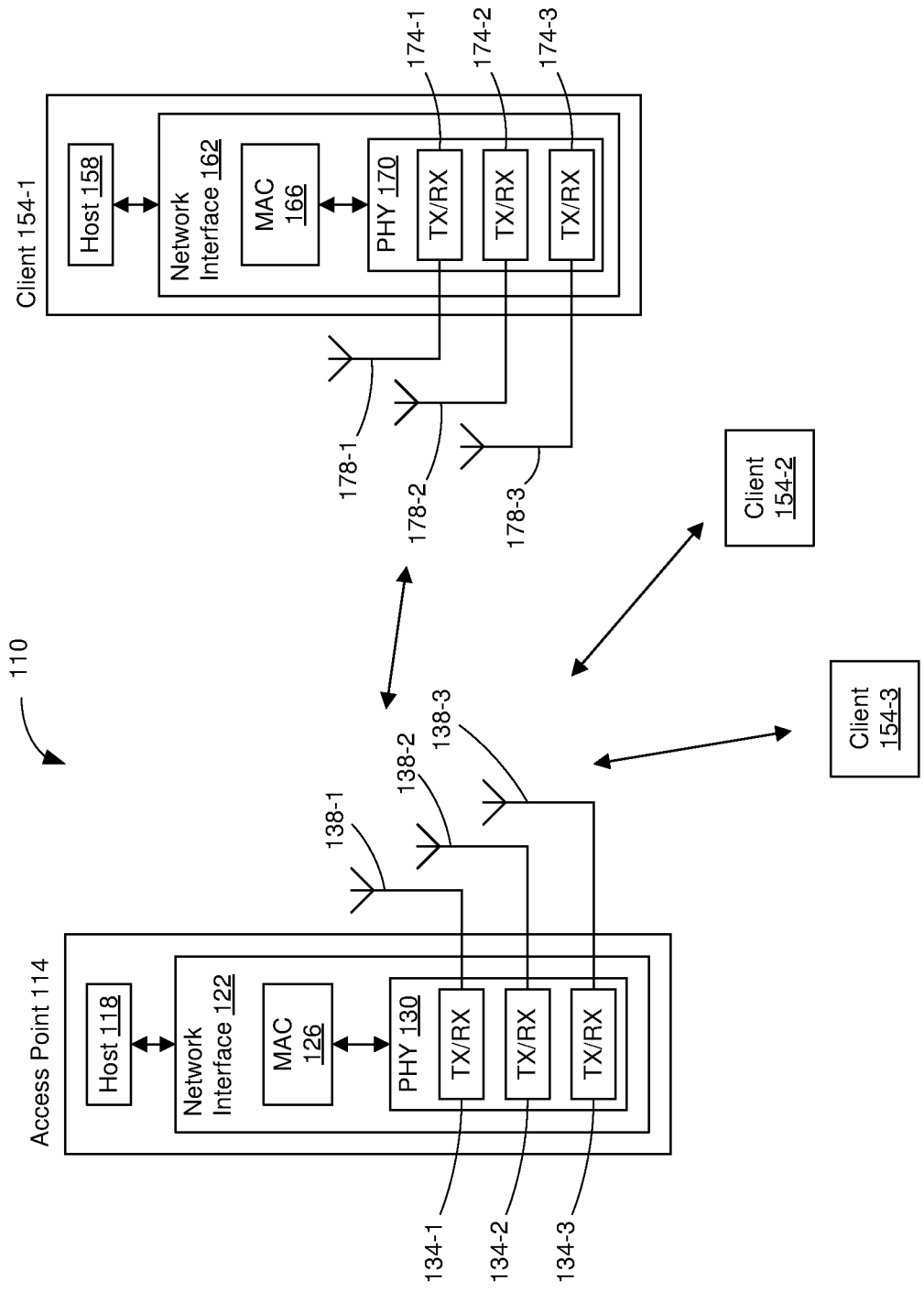
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets," and MAC layer data units are sometimes referred to herein as "frames."

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

In an embodiment, the MAC processor 126 and the PHY processor 130 are configured to operate according to a first WLAN communication protocol, and also according to one or more second WLAN communication protocols (e.g., as defined by one or more of the IEEE 802.11n Standard, IEEE 802.11ac Standard, the IEEE 802.11ax Standard and/or other suitable wireless communication protocols) that are legacy protocols with respect to the first WLAN communication protocol. The one or more second WLAN communication protocols are sometimes collectively referred to herein as a "legacy WLAN communication protocol" or simply "legacy protocol."

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, the MAC processor 166 and the PHY processor 170 are configured to operate according to the first WLAN communication protocol, and also according to the legacy WLAN communication protocol.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, one or both of the client stations 154-2 and 154-3 are configured to operate according to the legacy WLAN communication protocol, but not according to the first WLAN communication protocol. Such client stations are referred to herein as "legacy client stations." Similarly, an access point that is similar to the AP 114 and is configured to operate according to the legacy WLAN communication protocol, but not according to the first WLAN communication protocol, is referred to herein as a "legacy AP." More generally, wireless communication devices that are configured to operate according to the legacy WLAN communication protocol, but not according to the first WLAN communication protocol, are referred to herein as a "legacy communication devices."

Figures 2A, 2B:
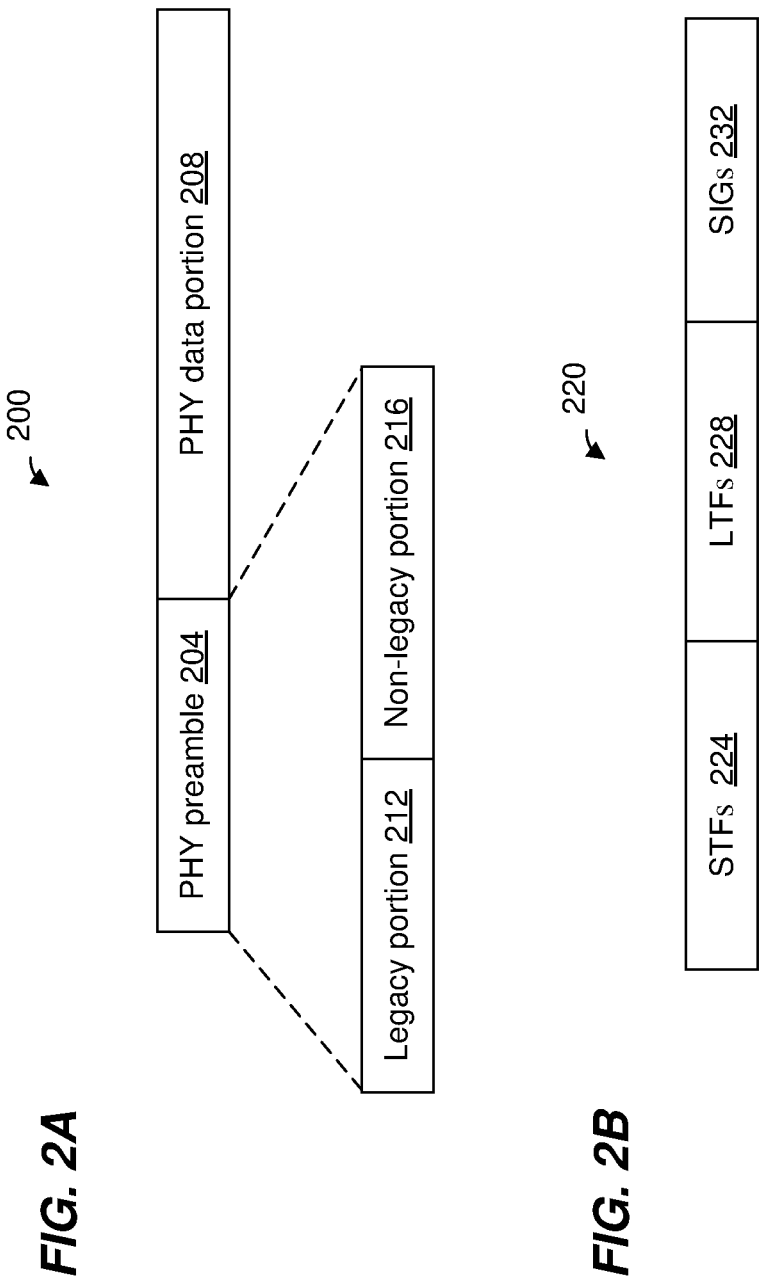
FIG. 2A is a block diagram of an example physical layer (PHY) data unit, according to an embodiment.
FIG. 2B is a block diagram of an example preamble of a PHY data unit, according to an embodiment.

FIG. 2A is a diagram of an example PPDU 200 that the network interface device 122 (FIG. 1) is configured to generate and transmit to one or more client stations 154 (e.g., the client station 154-1), according to an embodiment. The network interface device 162 (FIG. 1) may also be configured to transmit data units the same as or similar to the PPDU 200 to the AP 114. The PPDU 200 may occupy a 20 MHz bandwidth or another suitable bandwidth. Data units similar to the PPDU 200 occupy other suitable bandwidth such as 40 MHz, 60 MHz, 80 MHz, 100 MHz, 120 MHz, 140 MHz, 160 MHz, 180 MHz, 200 MHz, etc., for example, or other suitable bandwidths, in other embodiments.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy protocol), enabling the legacy communication devices to detect the PPDU 200 and to obtain PHY information corresponding to the PPDU 200, such as a duration of the PPDU 200.

FIG. 2B is a diagram of an example PHY preamble 220. In an embodiment, the PHY preamble 220 corresponds to the PHY preamble 204. In an embodiment, the PHY preamble 220 is included in the legacy portion 212. In another embodiment, the PHY preamble 220 is included in the non-legacy portion 216. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the number of LTFs in the LTFs 228 correspond to a number of spatial/space-time streams used for transmission of the PPDU 200. In an embodiment, the SIGs 232 are used to signal PHY communication parameters (e.g., a modulation and coding scheme (MCS), a number of spatial streams, a frequency bandwidth, etc.) corresponding to the PPDU 200.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the PPDU 200 is a multi-user (MU) orthogonal frequency division multiple access (OFDMA) data unit in which independent data streams are transmitted to multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

In an embodiment, an operating channel of a communication device in the WLAN 110 is divided into a plurality of smaller component channels. In an embodiment, the operating frequency band is divided into component channels, each corresponding to a width of 20 MHz, or another suitable frequency bandwidth. Multiple component channels may be concatenated, or "bonded" to form a wider channel. For instance, a 40 MHz channel may be formed by combining two 20 MHz component channels, an 80 MHz channel may be formed by combining two 40 MHz channels, a 160 MHz channel may be formed by combining two 80 MHz channels. In an embodiment, the operating frequency band is divided into component channels of a width different than 20 MHz.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively. In some such embodiments, at least a portion of the PPDU 200 (e.g., at least a legacy portion of the PHY preamble 204, or the entirety of the PHY preamble 204) is generated by generating a field corresponding to a 20 MHz component channel bandwidth and repeating the field over a number of 20 MHz component channels corresponding to the transmission channel, in an embodiment. For example, in an embodiment in which the PPDU 200 occupies an 80 MHz channel, at least the legacy portion 212 corresponding to the 20 MHz component channel bandwidth is replicated in each of four 20 MHz component channels that comprise the 80 MHz channel.

In an embodiment, one or more communication devices in the WLAN 110 (e.g., the AP 114, the client station 154, etc.) are configured for various multi-channel operations. In an embodiment corresponding to multi-channel operation, two or more communication channels (also sometimes referred to herein as a "channel segments") are aggregated to form an aggregate channel for synchronous transmission or reception over the two or more communication channels in the WLAN 110. For instance, in an embodiment, the AP 114 is configured to transmit a first signal in a first communication channel (also sometimes referred to herein as a "first channel segment"), and simultaneously transmit a second signal over a second communication channel (also sometimes referred to herein as a "second channel segment"), wherein the AP 114 commences transmission of the first signal and the second signal at a same start time. In an embodiment, the AP 114 is configured to cease transmission of the first signal and the second signal at a same end time. In an embodiment, the AP 114 is configured to receive a first signal in a first channel segment and simultaneously receive a second signal over a second channel segment, wherein the first signal and the second signal have an identical start time. In an embodiment, the first signal in a first channel segment and the second signal in the second channel segment have identical end times.

In an embodiment corresponding to multi-channel operation, the first channel segment and the second channel segment are non-contiguous, i.e., there is a gap in frequency between the first channel segment and the second channel segment. In another embodiment, the first channel segment and the second channel segment are contiguous, i.e., there is no frequency gap between the first channel segment and the second channel segment. In an embodiment, the first channel segment and the second channel segment are of different frequency bandwidths. In an embodiment, the first channel segment and the second channel segment consist of respective different numbers of component channels. In another embodiment, the first channel segment and the second channel segment are of a same bandwidth and consist of a same number of component channels.

In an embodiment, different communication devices (i.e., the AP 114 and the client stations 154) may be configured for operation in different frequency bands. In an embodiment, at least some communication devices (e.g., the AP 114 and the client station 154) in the WLAN 110 may be configured for operation over multiple different frequency bands. Exemplary frequency bands include, a first frequency band corresponding to a frequency range of approximately 2.4 GHz-2.5 GHz ("2 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band"). Each of the frequency bands comprises multiple component channels which may be combined within the respective frequency bands to generate channels of wider bandwidths, as described above. In an embodiment corresponding to multi-channel operation over multiple communication channel segments aggregated to form an aggregated communication channel, at least some of the multiple channel segments may be in different ones of multiple frequency bands, or the multiple channel segments may be within a same frequency band.

In an embodiment, the first WLAN communication protocol permits a greater variety of communication channel configurations than is permitted by the legacy WLAN communication protocol. For example, the legacy WLAN communication protocol permits certain combinations of component channels to form communication channels of certain bandwidths, and the first WLAN communication protocol permits additional component channel combinations in addition to the component channel combinations permitted by the legacy WLAN communication protocol. For example, whereas the legacy WLAN communication protocol permits contiguous bandwidths of 20 MHz, 40 MHz, 80 MHz, and 160 MHz and a split frequency bandwidth 80+80 MHz, the first WLAN communication protocol additionally permits contiguous bandwidths of 60 MHz, 100 MHz, 120 MHz, 140 MHz, and split frequency bandwidths of 20+20 MHz, 20+40 MHz, 20+80 MHz, 40+40 MHz, 40+80 MHz, etc.

In an embodiment, a communication device (e.g., the AP 114, the client station 154-1, etc.) configured to operate according to the first WLAN communication protocol includes multiple RF radios, where respective ones of the multiple RF radios transmit/receive signals in respective channel segments of an aggregate communication channel. The signals transmitted/received by respective ones of the multiple RF radios are synchronously transmitted/received in contiguous or non-contiguous channel segments, in various embodiments. For example, a signal transmitted/received in an 80 MHz-wide channel segment by a first RF radio and a signal in a 40 MHz-wide channel segment is synchronously transmitted/received by a second RF radio, where the 80 MHz-wide and the 40 MHz-wide channel segments form a contiguous 120 MHz channel bandwidth in one embodiment, and form a non-contiguous 80+40 MHz channel bandwidth in another embodiment.

Figure 3A:
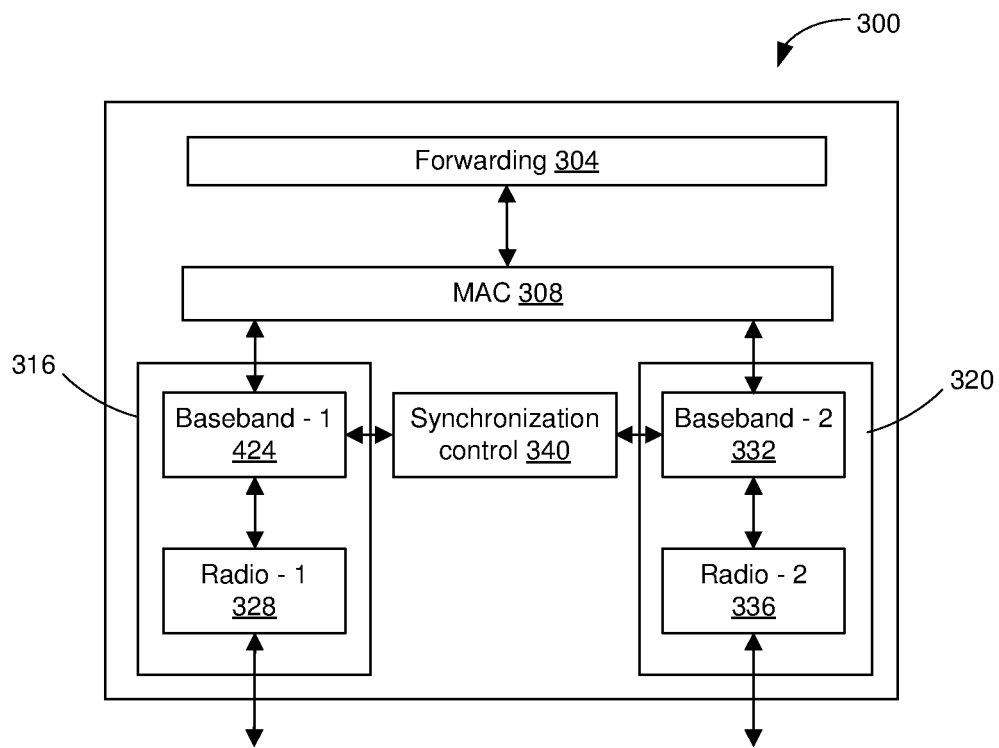
FIG. 3A is a diagram of an example system architecture corresponding to a communication device configured for multi-channel operation, according to an embodiment.

FIG. 3A is a diagram of an example system architecture 300 corresponding to a communication device configured for multi-channel operation, according to an embodiment. For instance, in an embodiment, the system architecture 300 is configured for synchronous transmission/reception over aggregated communication channel segments. In an embodiment, the system architecture 300 corresponds to the AP 114. In another embodiment, the system architecture 300 corresponds to the client station 154-1.

In an embodiment, the system architecture 300 is configured for operation over two communication channel segments and includes a forwarding processor 304. The communication device 300 also includes a single MAC processor 308, a first PHY processor 316, and a second PHY processor 320. The single MAC processor 308 is coupled to the first PHY processor 316 and the second PHY processor 320. The single MAC processor 308 exchanges frames with the first PHY processor 316 and the second PHY processor 320.

In an embodiment, the single MAC processor 308 corresponds to the MAC processor 126 of FIG. 1. In another embodiment, the single MAC processor 308 corresponds to the MAC processor 166 of FIG. 1. In an embodiment, the first PHY processor 316 and the second PHY processor 320 correspond to the PHY processor 130 of FIG. 1. In another embodiment, the first PHY processor 316 and the second PHY processor 320 correspond to the PHY processor 170 of FIG. 1.

The first PHY processor 316 includes a first baseband signal processor 324 (Baseband-1) coupled to a first RF radio 328 (Radio-1). The second PHY processor 320 includes a second baseband signal processor 332 (Baseband-2) coupled to a second RF radio 336 (Radio-2). In an embodiment, the RF radio 328 and the RF radio 336 correspond to the transceivers 134 of FIG. 1. In an embodiment, the RF radio 328 is configured to operate on a first RF band, and the RF radio 336 is configured to operate on a second RF band. In another embodiment, the RF radio 328 and the RF radio 336 are both configured to operate on the same RF band.

In an embodiment, the MAC processor 308 generates and parses data corresponding to MAC layer data units (e.g., frames) into a plurality of data streams corresponding to respective communication channel segments. The MAC processor 308 provides the parsed data streams to the Baseband-1 324 and the Baseband-2 332. The Baseband-1 324 and the Baseband-2 332 are configured to receive the respective data streams from the MAC processor 308, and encapsulate and encode the respective data streams to generate respective baseband signals corresponding to PPDUs. In an embodiment, the respective baseband signals have different bandwidths. The Baseband-1 324 and the Baseband-2 332 provide the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 328 transmits a first RF signal via the first channel segment and the Radio-2 336 transmits a second RF signal via a second channel segment.

The communication device 300 also includes synchronization control circuitry 340. The synchronization control circuitry 340 is configured to ensure that respective transmitted signals over the first channel segment and the second channel segment are synchronized. The synchronization control circuitry 340 is coupled to the Baseband-1 324 and the Baseband-2 332 to ensure that the respective baseband signals are synchronized in time.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the respective baseband signal processors Baseband-1 324 and Baseband-2 332. The Baseband-1 324 and the Baseband-2 332 generate respective data streams that are provided to the MAC processor 308. The MAC processor 308 processes the respective data streams. In an embodiment, the MAC processor 308 deparses the data streams received from the Baseband-1 324 and the Baseband-2 332 into a single information bit stream.

In an embodiment, the forwarding processor 304 is omitted and the MAC processor 308 is coupled to another suitable processor (e.g., the host processor 118 (FIG. 1)) that performs one or more higher level operations corresponding to data transmission and reception. For instance, in an embodiment, the other processor performs one or more operations corresponding to Layer 3 and above as characterized in the OSI model.

Figure 3B:
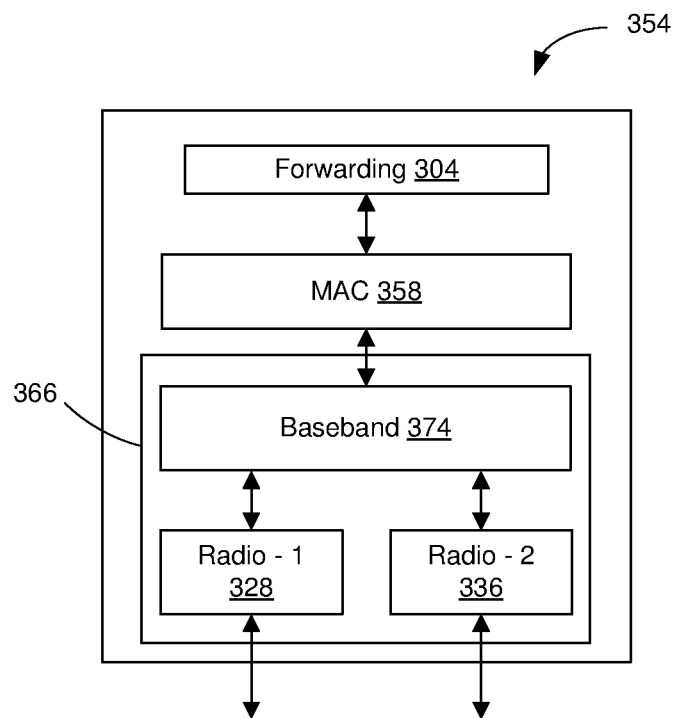
FIG. 3B is a diagram of an example system architecture corresponding to a communication device configured for multi-channel operation, according to another embodiment.

FIG. 3B is a diagram of an example system architecture 350 corresponding to a communication device configured for multi-channel operation, according to another embodiment. For instance, in an embodiment, the system architecture 350 is configured for synchronous transmission/reception over aggregated communication channels. In an embodiment, the system architecture 350 corresponds to the AP 114. In another embodiment, the system architecture 350 corresponds to the client station 154-1.

The system architecture 350 is similar to the system architecture 300 of FIG. 3A, and like-numbered elements are not discussed in detail for purposes of brevity.

The communication device 350 includes a single MAC processor 358 coupled to a PHY processor 366. The single MAC processor 308 exchanges frames with the PHY processor 366.

In an embodiment, the single MAC processor 358 corresponds to the MAC processor 126 of FIG. 1. In another embodiment, the single MAC processor 358 corresponds to the MAC processor 166 of FIG. 1. In an embodiment, the PHY processor 366 corresponds to the PHY processor 130 of FIG. 1. In another embodiment, the PHY processor 366 corresponds to the PHY processor 170 of FIG. 1.

The PHY processor 366 includes a single baseband signal processor 374. The single baseband signal processor 374 is coupled to the Radio-1 328 and the Radio-2 336.

In an embodiment, the MAC processor 358 generates data corresponding to MAC layer data units (e.g., frames) and provides the frames to the baseband signal processor 374. The baseband signal processor 374 is configured to receive frames from the MAC processor 358, and parse data corresponding to the frames into a plurality of bit streams. The baseband signal processor 374 is also configured to encapsulate and encode the respective bit streams to generate respective baseband signals corresponding to PPDUs. In an embodiment, the respective baseband signals have different bandwidths. The baseband signal processor 374 provides the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 820 transmits a first RF signal via the first channel segment and the Radio-2 336 transmits a second RF signal via a second channel segment.

The baseband signal processor 374 is configured to ensure that respective transmitted signals over the first channel segment and the second channel segment are synchronized. For example, the baseband signal processor 374 is configured to generate the respective baseband signals such that the respective baseband signals are synchronized in time.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the baseband signal processor 374. The baseband signal processor 374 generate respective bit streams, and de-parse the bit streams into a data stream corresponding to frames. The baseband signal processor 374 provides the frames to the MAC processor 358. The MAC processor 358 processes the frames.

As discussed above, an operating channel of a communication device in the WLAN 110 is divided into a plurality of smaller component channels, in an embodiment. In an embodiment, one or more of the smaller component channels are designated as respective one or more primary channels of the operating channel, and the remaining component channels are designated secondary channels of the operating channel. A communication device (e.g., the AP 114 or the client station 154-1) operating in the WLAN 110 utilizes the one or more component channel that are designated as primary channels for various operations, such as for transmission of various management transmissions (e.g., transmissions associated with association of a client station 154 with the AP 114, beacon transmissions by the AP 114, operating channel bandwidths switch announcement transmissions, etc.), for conducting clear channel assessment (CCA) procedures, etc., in various embodiments. For example, in an embodiment in which a first channel segment is aggregated with a second channel segment to form an aggregate communication channel, a first component channel in the first channel segment is designated as a first primary channel of the aggregate communication channel and a second component channel in the second channel segment is designated in a second primary channel of the aggregate communication channel. In another embodiment, an aggregate communication channel of a communication device (e.g., the AP 114 or the client station 154-1) includes a single primary channel. For example, in an embodiment in which a first channel segment is aggregated with a second channel segment form an aggregate communication channel, a component channel in one of the first channel segment and the second channel segment is designated as a primary channel of the aggregate communication channel. The other one of the first channel segment and the second channel segment does not include a primary channel, in this embodiment FIG. 4A is a diagram of an example operating channel 400, according to an embodiment. In an embodiment, the operating channel 400 corresponds to an operating channel of the AP 114, or of a basic service set (BSS) supported by the AP 114 of the WLAN 110 of FIG. 1. In another embodiment, the operating channel 400 corresponds to an operating channel of a client station 154 (e.g., the client station 154-1) of the WLAN 110 of FIG. 1. In other embodiments, the operating channel 400 is employed by communication devices (e.g., APs or client stations) different from the AP 114 and/or client stations 154 of the WLAN 110 of FIG. 1, or in suitable communication networks different from the WLAN 110 of FIG. 1. An operating channel such as the operating channel 400 that corresponds to an operating channel of an AP or a BSS supported by the AP is sometimes referred to herein as an "AP operating channel" or a "BSS operating channel." An operating channel such as the operating channel 400 that corresponds to an operating channel of a client station is sometimes referred to herein as an "STA operating channel."

The operating channel 400 includes a first channel segment 404 aggregated with a second channel segment 408. The first channel segment 404 and the second channel segment 408 each includes one or more component channels 410. For example, the first channel segment 404 comprises four component channels 410-1 to 410-4 and the second channel segment 408 comprises four component channels 410-5 to 410-8, in the illustrated embodiment.

In an embodiment, the first channel segment 404 and the second channel segment 408 are non-adjacent in frequency. For example, a gap in frequency exists between the first channel segment 404 and the second first channel segment 408. In various embodiments, the gap is at least 500 kHz, at least 1 MHz, at least 5 MHz, at least 20 MHz, etc. In another embodiment, the first channel segment 404 and the second channel segment 408 are adjacent in frequency. In this embodiment, there is no frequency gap between first channel segment 404 and the second channel segment 408.

In an embodiment, each component channel 410 of the operating channel 400 spans a 20 MHz bandwidth. Thus, for example, the first channel segment 404 that includes four component channels 410 spans an 80 MHz bandwidth and the second channel segment 408 that comprises four component channels equally spans an 80 MHz bandwidth. In an embodiment, each component channel 410 spans a 20 MHz bandwidth. Thus, for example, the first channel segment 404 that includes four component channels 410 spans an 80 MHz bandwidth and the second channel segment 408 that comprises four component channels equally spans an 80 MHz bandwidth. In some embodiments, the first channel segment 404 and the second channel segment 408 do not include equal numbers of component channels and do not have equal bandwidths.

In an embodiment in which the first channel segment 404 spans an 80 MHz bandwidth, the second channel segment 408 spans 404 spans an 80 MHz bandwidth, and the first channels segment is not adjacent in frequency with the second channel bandwidth (as in FIG. 4A), the operating channel 400 is sometimes referred to as an 80+80 MHz channel. On the other hand, in an embodiment in which the first channel segment 404 spans an 80 MHz bandwidth, the second channel segment 408 spans 404 spans an 80 MHz bandwidth, and the first channels segment is adjacent in frequency with the second channel bandwidth, the operating 400 is sometimes referred to as 160 MHz channel. In general, communication channels similar to the operating channel 400 in which the first channel segment and the second channel segment are not adjacent in frequency, the aggregate communication channel is referred to as (bandwidth of the first channel segment)+(bandwidth of the second channel segment) channel. On the other hand, communication channels similar to the operating channel 400 in which the first channel segment and the second channel segment are adjacent in frequency, or in which the second channel 408 is omitted (i.e., the second channel segment 408 has a bandwidth of 0 MHz), the aggregate communication channel 400 is referred to as (the sum of the first channel segment bandwidth and the second channel segment bandwidth) channel. In an embodiment, valid channel configurations of the aggregate communication channel 400 supported by the first communication protocol include: 20 MHz channel, 40 MHz channel, 60 MHz channel, 80 MHz channel, 100 MHz, 120 MHz channel, 140 MHz channel, channel 160 MHz channel, 20+40 MHz channel, 20+80 MHz channel, 40+80 MHz channel, and so on. In an embodiment, a respective bandwidth of each channel segment 404, 408 is selected from a set of possible channel bandwidths of 20 MHz, 40 MHz and 80MHz. In other embodiments, other suitable sets of possible bandwidths are utilized.

The operating channel 400 includes multiple primary channels. For example, at least one component channel 410 of the first channel segment 404 and at least one component channel 410 of the second channel segment 408 is designated as a respective primary channel of the operating channel 400, in an embodiment. In the illustrated embodiment, for example, the component channel 410-2 the first channel segment 404 is designated as a first primary channel and the component channel 410-7 of the second channel segment 408 is designated as a second primary channel. In some embodiment, multiple component channels 410 of a same channel segment 404, 408 are designated as respective primary channels. For example, in addition to the component channel 410-2 of the channel segment 404 being designated as a primary channel of the operating channel 400, the component channel 410-4 of the channel segment 404 is also designated as a primary channel (not shown) of the operating channel 400, in an embodiment. In some embodiments, the operating channel 400 includes more than two primary channels. For example, more than two component channels 410 of the operating channel 400 are designated as primary channels, in some embodiments.

In an embodiment, each component channel 410 of the of the operating channel 400 that is not designated as a primary channel is designated as a secondary channel. Thus, for example, each of the three component channels 410 in the first channel segment 404 (the component channel 410-1, the component channel 410-3 and the component channel 410-4) of the first channel segment 404 is designated as a secondary channel, in the illustrated embodiment. Similarly, each of the three component channels 410 in the first channel segment 404 (the component channel 410-5, the component channel 410-6 and the component channel 410-7) of the second channel segment 408 is designated as a secondary channel, in the illustrated embodiment. In other embodiments, the first channel segment 404 and/or the second channel segment 408 includes another suitable number (e.g., 0, 1, 2, 4, 5, etc.) of secondary channels. In some embodiments, the number of secondary channels of the first channel segment 404 is not equal to the number of secondary channels of the second channel segment 408.

Figure 4B:
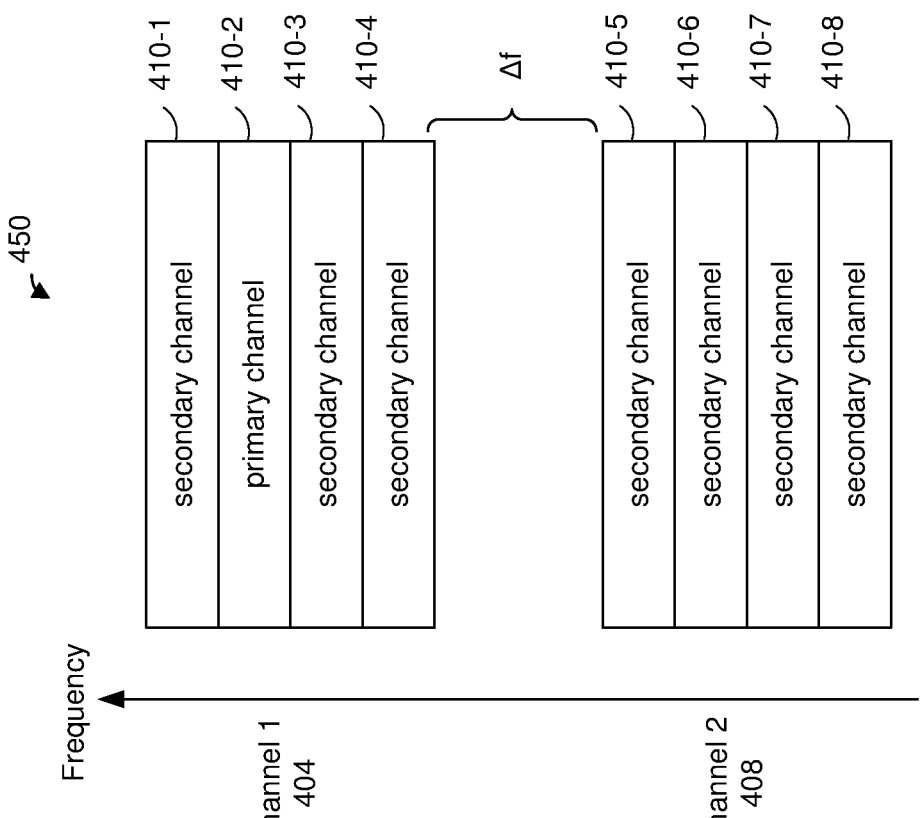
FIG. 4B is a diagram of an example operating channel, according to another embodiment.
Figure 4A:
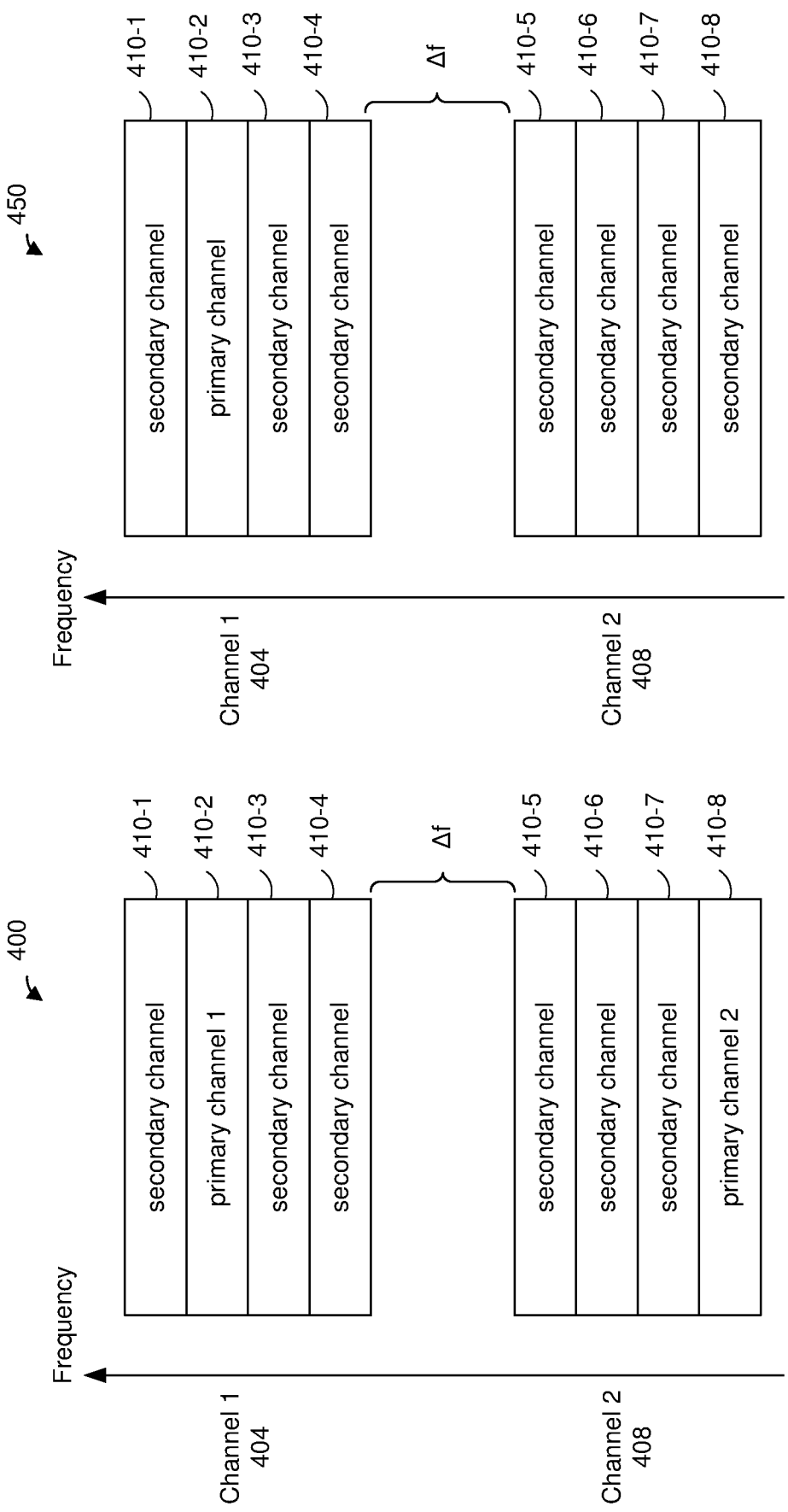
FIG. 4A is a diagram of an example operating channel, according to an embodiment.

FIG. 4B is a diagram of an example operating channel 450, according to an embodiment. In an embodiment, the operating channel 450 corresponds to an operating channel of the AP 114, or of a basic service set (BSS) supported by the AP 114 of the WLAN 110 of FIG. 1. In another embodiment, the operating channel 450 corresponds to an operating channel of a client station 154 (e.g., the client station 154-1) of the WLAN 110 of FIG. 1. In other embodiments, the operating channel 450 is employed by communication devices (e.g., APs or client stations) different from the AP 114 and/or client stations 154 of the WLAN 110 of FIG. 1, or in suitable communication networks different from the WLAN 110 of FIG. 1. An operating channel such as the operating channel 450 that corresponds to an operating channel of an AP or a BSS supported by the AP is sometimes referred to herein as an "AP operating channel" or a "BSS operating channel." An operating channel such as the operating channel 450 that corresponds to an operating channel of a client station is sometimes referred to herein as an "STA operating channel."

The operating channel 450 is generally the same as the operating channel 400 of FIG. 4A, except that whereas the operating channel 450 includes multiple primary channels as discussed above, the operating channel 450 includes a single primary channel. Thus, for example, in the operating channel 450, a first component channel 410 (e.g., the component channel 410-2 of the first channel segment 404) is designated as the primary channel of the operating channel 400. The remaining component channels of the first channel segment 404 and the second channel segment 408 are designated as respective secondary component channels, in an embodiment.

In an embodiment, legacy client stations that conform to the legacy protocol do not support operating channel with multiple primary channels. In some embodiments, to facilitate interoperability of the AP 114 with legacy client stations, the first communication protocol does not permit multiple primary channels in an AP operating channel when the AP operating channel is also supported by the legacy protocol. Accordingly, in an embodiment, the AP 114 is configured to operate with an AP operating channel (e.g., the operating channel 450 of FIG. 4B) that includes a single primary channel when the operating channel is also permitted by the legacy protocol, and to operate with an AP operating channel (e.g., the operating channel 400 of FIG. 4A) that includes multiple primary channels when the operating channel is not permitted by the legacy protocol. As an example, the AP 114 is configured to operate with an AP operating channel (e.g., the operating channel 450 of FIG. 4B) that includes a single primary channel when the operating channel is a 20 MHz channel, a 40 MHz channel, an 80 MHz channel, a 160 MHz channel or an 80+80 MHz channel, and to operate with an AP operating channel (e.g., the operating channel 400 of FIG. 4A) that includes multiple primary channels otherwise, such as when the operating channel is a 100 MHz channel, a 120 MHz channel, a 40 +40 MHz channel, a 40+80 MHz channel, etc.

In some embodiments, an operating channel of a client station (e.g., the client station 154-1) has a bandwidth that is narrower than a bandwidth of an operating channel of the AP 114. In an embodiment, a client station 154 (e.g., the client station 154-1) operating with an operating channel that is narrower than an operating channel of the AP 114 is permitted to operate at any location within the operating channel of the AP 114. For example, the client station 154-1 is permitted to operate with an operating channel that does not include any primary channel of the AP 114. In another embodiment, the client station 154 (e.g., the client station 154-1) operating with an operating channel that is narrower than an operating channel of the AP 114 is not permitted to operate with an operating channel that does not include at least one primary channel of the AP 114. In this embodiment, an operating channel of the client station 154 (e.g., the client station 154-1) that is narrower than an operating channel of the AP 114 operates at a location within the operating channel of the AP 114 that includes at least one primary channel of the AP 114.

Figure 5:
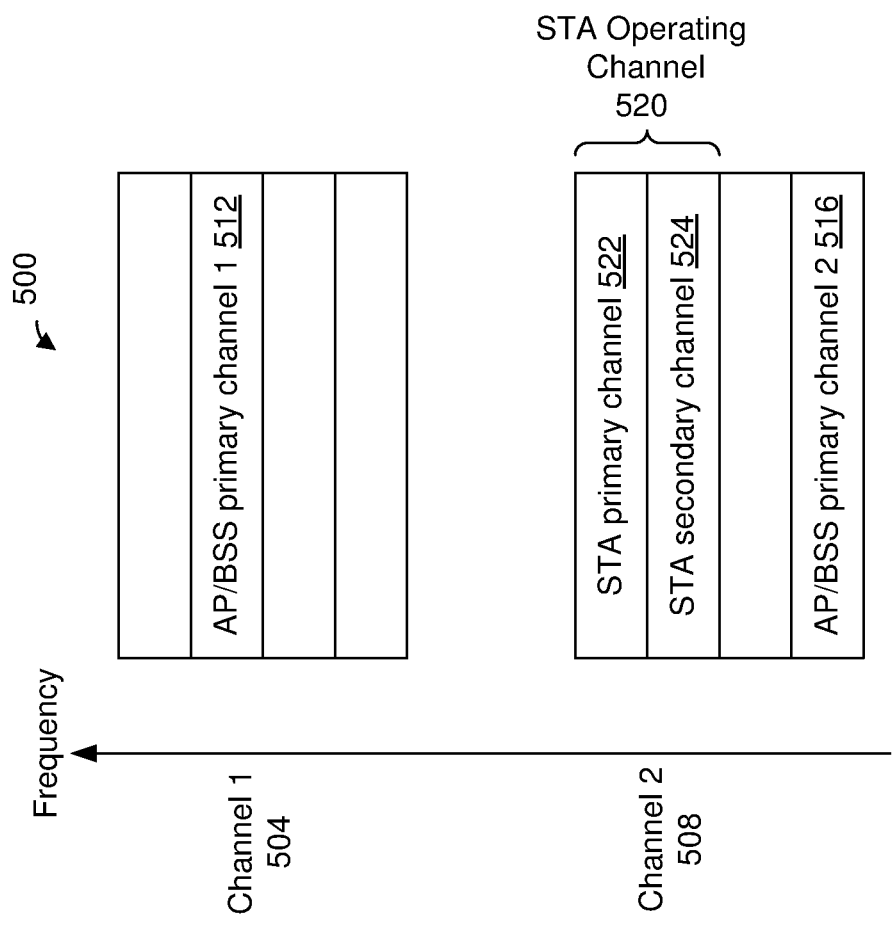
FIG. 5 is a block diagram of an example operating channel of an access point (AP) and an example operating channel of a client station (STA), according to an embodiment.

FIG. 5 is a block diagram illustrating an example operating channel 500 (sometimes referred to herein as "AP operating channel 500" or "BSS primary channel 500") of the AP 114 and an example operating channel 520 (sometimes referred to herein as "STA operating channel 520") of a client station (e.g., the client station 154-1), according to an embodiment. The AP operating channel 500 corresponds to the operating channel 400 of FIG. 4A, in an embodiment. The AP operating channel 500 includes a first channel segment 504 corresponding to the first channel segment 404 of FIG. 4A aggregated with a second channel segment 508 corresponding to the second channel segment 408 of FIG. 4A, in an embodiment. The first channel segment 504 includes a first primary channel 512 and the second channel segment 508 includes a second primary channel 516. A primary channel of an AP operating channel is sometimes referred to herein as an "AP primary channel." Thus, for example, the first primary channel 512 of the AP operating channel 500 is sometimes referred to herein as an "the first AP primary channel 512," and the second primary channel 516 of the AP operating channel 500 is sometimes referred to herein as "the second AP primary channel 516."

In another embodiment, the AP operating channel 500 corresponds to the operating channel 450 of FIG. 4B. In this embodiment, the AP operating channel 500 includes a single AP primary channel. For example, one of the component channel 512 or the component channel 516 of the AP operating channel 500 is not designated as a primary channel and is instead used as a secondary channel, in an embodiment.

In the embodiment of FIG. 5, the STA operating channel 520 of the client station 154 is narrower than the AP operating channel 500 of the AP 114 and includes fewer component channels as compared to the number of component channels included in the AP operating channel 500 of the AP 114. In another embodiment, the STA operating channel 520 of the client station 154 spans the entire bandwidth of the AP operating channel 500 and includes the same number of component channels as the number of component channels of the AP operating channel 500.

In an embodiment in which the STA operating channel 520 of the client station 154 is narrower than the AP operating channel 500 of the AP 114, the client station 154 is permitted to operate such that the STA operating channel 520 does not span any AP primary channel of the AP operating channel 500. Accordingly, in an embodiment, the STA operating channel 520 spans one or more secondary channels of the AP operating channel 500 without spanning either the AP primary channel 512 or the AP primary channel 516 of the operating channel 500. In an embodiment, the location of the STA operating channel 520 of the client station 154 in the AP operating channel 500 of the AP 114 is established, for example, by an association procedure, a target wake time (TWT) session negotiation procedure, or another suitable procedure. Once the location of the STA operating channel 520 is established, the AP 114 transmits data units to the client station 154 in the STA operating channel 520 without transmitting any portion of the data units to the client station 154 in any AP primary channel of the AP operating channel 500, in an embodiment. The client station 154 receives data units from the AP 114 in the STA operating channel 520 without any portion of the data units transmitted to the client station 154 being in an AP primary channel of the AP operating channel 500, in an embodiment. Similarly, the client station 154 transmits data units to the AP 114 in the operating channel 520 without any portion of the data units transmitted by the client station 154 being in an AP primary channel of the operating channel 500. The AP 114 receives data units from the client station 154 in the STA operating channel 520 without any portion of the data units from the client station 154 being in any AP primary channel of the AP operating channel 500, in an embodiment.

In another in which the STA operating channel 520 of the client station 154 is narrower than the AP operating channel 500 of the AP 114, the client station 154 is not permitted to operate such that the STA operating channel 520 does not span any AP primary channel of the AP operating channel 500. Accordingly, the STA operating channel 520 of the client station 154 must include at least one of the first AP primary channel 512 or the second primary channel 516 of the AP operating channel 500, in this embodiment.

In some embodiments, a component channel of the STA operating channel 520 of the client station 154 is designated as a primary channel of the STA operating channel 520 (sometimes referred to herein as "STA primary channel"). The client station 154 utilizes its designated STA primary channel as the primary channel during clear channel access procedures for determining whether the client station 154 can initiate a transmission to the AP 114, for example. In an embodiment, the client station 154 utilizes its designated STA primary channel in CCA procedures, such as for setting a channel access timer use in the CCA procures. In other embodiments, the client station 154 utilizes its designated primary channel in other suitable manners.

In an embodiment, if the STA operating channel 520 spans at least one AP primary channel 512, 516, then at least one of the AP primary channels 512, 516 spun by the STA operating channel 520 is designated as the STA primary channel of the STA operating channel 520. On the other hand, if the STA operating channel 520 does not span any AP primary channel of the AP operating channel 500, then one of the component channels of the STA operating channel 520, that corresponds to a secondary channel of the AP operating channel 500, is designated as the primary channel of the STA operating channel 520. In the embodiment of FIG. 5, the operating channel 520 includes an STA primary channel 522 that coincides with a secondary channel of the AP operating channel 500. One or more component channels of the STA operating channel 520 that are not designated as the STA primary channel are designated as STA secondary channels, in an embodiment. For example, in addition to the STA primary channel 522, the operating channel 520 in FIG. 5 includes an STA secondary channel 524 that coincides with another secondary channel of the AP operating channel 500, in the illustrated embodiment.

In an embodiment, the client station 154 indicates to the AP 114 which particular component channel of the STA operating channel 520 is designated as the STA primary channel. In another embodiment, the AP 114 indicates to the client station 154 which particular component channel of the STA operating channel 520 is designated as the STA primary channel. In yet another embodiment, the particular component channel of the STA operating channel 520 to be designated as the STA primary channel of the STA operating channel 520 is negotiated in a procedure (e.g., an association procedure, a TWT session setup procedure, etc.) conducted between the AP 114 and the client station 154.

In an embodiment, a communication device (e.g., the AP 114 or the client station 154) is configured to dynamically select at least a portion of the operating channel of the communication device, and to transmit in the selected at least the portion of the operating channel. In an embodiment the communication device is configured to select at least the portion of the operating channel by selecting at least a portion of the operating channel that satisfies the following criteria i) the at least the portion of the operating channel includes at least one primary channel of the operating channel ii) each component channel in the at least the portion of the operating channel is idle and iii) the idle component channels of the operating channel form a valid channel configuration supported by the first communication protocol, e.g., one of 20 MHz channel, 40 MHz channel, 60 MHz channel, 80 MHz channel, 100 MHz, 120 MHz channel, 140 MHz channel, channel 160 MHz channel, 20+40 MHz channel, 20+80 MHz channel, 40+80 MHz channel, 80+80 MHz channel and so on, then the communication device performs a transmission (e.g., transmits a data unit to one or more other communication devices) in the valid channel configuration. For ease of explanation, dynamic selection of at least a portion of an operating channel for transmission is described below with reference to the AP 114 of FIG. 1 operating with the operating channel 400 of FIG. 4A and/or the operating channel 450 of FIG. 4B. In other embodiments, however, dynamic selection is performed by another suitable communication device (e.g., a client station 154 or any other suitable communication device) and/or by a communication device operating with a suitable operating channel different from the operating with the operating channel 400 of FIG. 4A and/or the operating channel 450 of FIG. 4B.

In an embodiment, the AP 114 is configured to perform a CCA procedure, such as a distributed channel access (DCA) or enhanced DCA (EDCA) procedure to determine when at least a portion of the operating channel of the AP 114 is available for transmission by/to the AP 114. In an embodiment, the AP 114 is configured to perform the CCA procedure by performing one or both of i) a virtual CCA procedure and ii) a physical CCA procedure to determine when at least a portion of the operating channel of the AP 114 is available for transmission by/to the AP 114. The AP 114 performs virtual CCA by detecting, in the communication channel, a data unit that is not addressed to the AP 114 (e.g., a data unit addressed to one or more client stations 154 or a data unit addressed to another AP), decoding a duration indication in the PHY and/or MAC header of the data unit, and setting a channel access timer (sometimes referred to herein as "navigation allocation vector timer" or simply "NAV" timer) based on the duration obtained from the data unit. The AP 114 then counts down the channel access timer until the timer reaches zero.

When the channel access timer reaches 0, the AP 114 perform a physical CCA procedure in which the AP 114 senses one or more component channels of the communication channel for a predetermined period of time to determine whether at least a portion of the communication channel is idle. Sensing a component channel involves measuring a signal energy level in the component channel and comparing the measured signal energy level to a threshold, according to an embodiment. In an embodiment, the AP 114 determines the component channel to be busy if the measured signal energy level in the component channel exceeds the threshold, according to an embodiment. On the other hand, the AP 114 determines the component channel to be idle if the measured signal energy level in the component channel does not exceed (e.g., is less than or equal to) the threshold, according to an embodiment.

The AP 114 maintains one or more NAV timers corresponding to one or more primary channels of the operating channel of the AP 114, in various embodiments. In an embodiment in which the operating channel of the AP 114 includes a single primary channel, such as the operating channel 450 of FIG. 4B, the AP 114 maintains a single NAV timer corresponding to the single primary channel of the operating channel. In an embodiment in which the operating channel of the AP 114 includes multiple primary channels, such as the operating channel 400 of FIG. 4A, the AP 114 maintains multiple NAV timers, respective ones of the multiple NAV timers corresponding to respective ones of the primary channels. Thus, for example, the AP 114 operating with the operating channel 400 maintains a first NAV timer corresponding to the first primary channel 410-2 and maintains a second NAV timer corresponding to the second primary channel 410-8, in an embodiment. The AP 114 maintains each NAV timer independently of any other NAV timer of the multiple NAV timers maintained by the AP 114, in an embodiment. The AP 114 independently counts down each NAV timer of the multiple NAV timers, in an embodiment.

When the value of at least one NAV timer of the one or more NAV timers maintained by the AP 114 reaches zero, the AP 114 determines that at least a portion of its operating channel is now idle according to the virtual carrier sense procedure, in an embodiment. The AP then attempts to access at least the portion of the operating channel that is determined by the virtual carrier sense procedure to be idle, in an embodiment. For example, the AP 114 performs a physical carrier sense procedure to determine whether the AP 114 is able to transmit in at least the portion of its operating channel, in an embodiment.

In various embodiments, the AP 114 maintains, for each of the multiple NAV timers, one or more state variables associated with the data unit that was last used to set the NAV timer. For example, when the AP 114 sets or updates a value of a NAV timer, the AP 114 also records, in a memory, one or more parameters obtained from the data unit. For example, in an embodiment, the AP 114 records a bandwidth (sometimes referred to herein as "bandwidth state") of the data unit. The recorded bandwidth of the data unit indicates the bandwidth that is being protected by the NAV timer, i.e., the bandwidth that is indicated as busy by a non-zero value of the NAV timer, in an embodiment. Additionally or alternatively, in some embodiments the AP 114 is configured record one or more identifiers (sometimes referred to herein as "identifier state") of devices or networks associated with transmission of the data unit such as, for example, one or more of i) a BSS identifier obtained from a MAC header the data unit, the BSSID indicating a BSS associated with transmission of the data unit, ii) a receive address (RA) and/or a transmit address (TA) obtained from the MAC header of the data unit, the RA and/or TA indicative of a device that transmitted the data unit and/or a device to which the data unit is directed and iii) a BSS color obtained from a PHY header of the data unit, the BSS color indicating a BSS associated with transmission of the data unit. In various embodiments, the AP 114 utilizes the one or more state variables associated with a NAV timer to determine which portion of the operating channel is being protected by the NAV timer. In an embodiment, the AP 114 utilizes the one or more state variables associated with a NAV timer to determine whether or not to update the NAV timer when a new data unit is detected in the primary channel to which the NAV timer corresponds.

In an embodiment, while one or more of the multiple NAV timers are non-zero, the AP 114 continues to monitor at least the one or more primary channels of the operating channel of the AP 114, to detect any new data units in the communication channel and to determine whether the values of one or more of the multiple NAV timers should be updated or reset based on the new data units. The determination of whether or not to update a value of a NAV timer depends on one or more parameters of the data unit that is detected in the primary channel corresponding to the NAV timer, in an embodiment. For example, to determine whether or not to update the value of a NAV timer based on a new data unit detected in the primary channel corresponding to the NAV timer, the AP 114 compares i) a bandwidth indicated in the new data unit with the bandwidth currently associated with the NAV timer and ii) a duration indicated in the new data unit with a current value (sometimes referred to herein as "the remaining time") of the NAV timer. The AP 114 then determines whether or not to update the value of the NAV timer in accordance with the following scenarios, in an embodiment.

In one scenario, if i) the bandwidth indicated in the data unit is greater than the bandwidth currently associated with the NAV timer and ii) the duration indicated in the new data unit is greater than the current remaining time of the NAV timer, this indicates that the NAV timer should be set to protect the wider bandwidth and for a longer duration associated with the new data unit, in an embodiment. Accordingly, the AP 114 sets i) the bandwidth associated with the NAV timer to the bandwidth indicated in the new data unit and ii) the value of the NAV timer to the duration indicated in the new data unit. Additionally, because the NAV timer is now set based on the new data unit, the AP 114 updates one or more identifier state variables associated with the NAV timer based on corresponding values obtained from the new data unit, in an embodiment. For example, the AP 114 updates one or more of the BSSID, the RA/TA, and the BSS color associated with the NAV timer to the corresponding values obtained from the new data unit, in an embodiment.

In another scenario, if i) the bandwidth indicated in the new data unit is greater than the bandwidth currently associated with the NAV timer and ii) the duration indicated in the new data unit is not greater than (i.e., is less than or equal to) the remaining time of the NAV timer, this indicates that the NAV timer should be set to protect the wider bandwidth and that no increase in the duration of protection relative to the current value of the NAV timer is required. Accordingly, in this scenario, the AP 114 sets the bandwidth associated with the NAV timer to the bandwidth indicated in the new data unit and does not update the value of the NAV timer, in an embodiment. Additionally, because the NAV timer is now set based on the new data unit, the AP 114 updates one or more identifier state variables associated with the NAV timer based on corresponding values obtained from the new data unit, in an embodiment. For example, the AP 114 updates one or more of the BSSID, the RA/TA, and the BSS color associated with the NAV timer to the corresponding values obtained from the new data unit, in an embodiment.

On the other hand, if i) the bandwidth indicated in the new data unit is not greater than (e.g., is less than or equal to) the bandwidth currently associated with the NAV timer and ii) the duration indicated in the new data unit is greater than the remaining time of the NAV timer, this indicates that protection of the bandwidth currently associated with the NAV timer (set based on the bandwidth indicated by the last data unit) is still needed and that the duration the NAV timer should be increased to protect to the longer duration of the new data unit. Accordingly, in this scenario, the AP 114 does not update the bandwidth associated with the NAV timer, but sets the value of the NAV timer to the duration indicated on the new data unit, in an embodiment. Additionally, because the NAV timer is now set based on the new data unit, the AP 114 updates one or more identifier state variables associated with the NAV timer based on corresponding values obtained from the new data unit, in an embodiment. For example, the AP 114 updates one or more of the BSSID, the RA/TA, and the BSS color associated with the NAV timer to the corresponding values obtained from the new data unit, in an embodiment.

In some scenarios, the AP 114 is unable to determine a bandwidth of the new data unit. For example, the new data unit is being transmitted in a duplicate mode (e.g., duplicate PPDU), and the AP 114 is able to process only a portion of the data such as only a legacy portion of the data unit, in an embodiment. In this scenario, the AP 114 compares the values of one or more identifier state variables associated with the NAV timer with the corresponding values obtained from the new data unit, in an embodiment. For example, the AP 114 compares one or more of the BSSID, the RA/TA, and the BSS color associated with the NAV timer to the corresponding values obtained from the new data unit. If the one or more of the BSSID, the RA/TA, and the BSS color associated with the NAV timer match the corresponding values obtained from the new data unit, then the AP 114 assumes that the bandwidth of the new data unit is the same as the bandwidth currently associated with the NAV timer. Otherwise, if one or more of the BSSID, the RA/TA, and the BSS color associated with the NAV timer does not match the corresponding values obtained from the new data unit, then the AP 114 assumes that the bandwidth of the new data unit equal the bandwidth of the operating channel of the to which the AP 114 belongs, in an embodiment. The AP then determines whether or not to update the value of the NAV timer and the one or more state variables associated with the NAV timer based on the new data unit as described above except that the AP 114 utilizes the assumed bandwidth of the data unit rather than the bandwidth indicated in the data unit, in an embodiment.

In an embodiment in which respective ones of the primary channels of the operating channel of the AP 114 are in respective channel segments of the operating channel, a NAV timer corresponding to a particular one of the primary channels is assumed to protect the entire corresponding channel segment of the operating channel. Thus, for example, in an embodiment, the first NAV timer associated with the primary channel 410-2 of the channel segment 404 of the operating channel 400 is used to protect the bandwidth of the channel segment 404 and the second NAV timer associated with the primary channel 410-8 of the channel segment 408 of the operating channel 400 is used to protect the bandwidth of the channel segment 408, in an embodiment. In some such embodiments, the AP 114 does not maintain one or more state variables associated with each of the multiple NAV timers. For example, the AP 114 maintains only the respective durations of the respective NAV timers based on respective data units detected in the primary channels corresponding to the respective NAV timers. In an embodiment, if the AP 114 detects a new data unit that spans multiple channel segments with respective primary channels, the AP 114 compares a BSS identifier (e.g., BSSID or BSS color) obtained from the new data unit with its own BSS identifier to determine if the new data unit is originated in the BSS ("self-BSS") of the AP 114. If the new data unit is determined to be originated in the self-BSS of the AP 114, then, for each of the multiple NAV timers, the AP 114 determines, based on a current remaining time of the NAV timer and a duration indicated in the new data unit, whether or not to update the value of the NAV timer based on the duration indicated in the new data unit. In some embodiments, the AP 114 maintain one or more state variables associated with each of the multiple NAV timers, and utilize the state variables in determining portions of the channel being protected by respective NAV timers and whether or not to update values of the respective NAV timers as described above even if the respective NAV timers are in respective channel segments of the operating channel of the AP 114.

In an embodiment, when at least one of the one or more NAV timers maintained by the AP reaches zero, the AP 114 implements a physical CCA procedure in which the AP 114 initiates a backoff timer for the corresponding primary channel to determine when the primary channel is available for transmission by/to the AP 114. In an embodiment in which multiple NAV timers are being maintained, the AP 114 implements the physical CCA in which the AP 114 initiates a backoff timer for the corresponding primary channel while continuing to count down non-zero NAV timer(s). As an example, when the first NAV timer corresponding to the first primary channel 410-2 reaches zero, the AP 114 initiates a backoff timer corresponding to the primary channel 410-2 while continuing to count down the second NAV timer corresponding to the second primary channel 410-8, in an embodiment.

In an embodiment, prior to expiration of the backoff timer corresponding to the primary channel, the AP 114 also initiates respective backoff timers for the other competent channels of its operating channel to determine whether each of the other component channels is idle and available for transmission or is busy and not available for transmission. In an embodiment, the AP 114 determines that a particular component channel is busy at the time when the primary channel is determined to be idle if i) any NAV timer that is currently set to protect a channel portion that includes the component channel is non-zero and ii) the AP 114 detected a transmission in the component channel based on the backoff counter corresponding to the component channel during a predetermined time period prior to the time when the primary channel is determined to be idle. On the other hand, the AP 114 determines that a particular component channel is idle at the time when the primary channel is determined to be idle if i) no NAV timer is currently set to protect a channel portion that includes the component channel and ii) the AP 114 did not detect a transmission in the component channel based on the backoff counter corresponding to the component channel during the predetermined time period prior to the time when the primary channel is determined to be idle. In an embodiment, the predetermined time period corresponds to short inter-frame space (S IFS). In another embodiment, the predetermined time period corresponds to point coordination function (PCF) inter-frame space (PIFS). In another embodiment, another suitable time period is utilized.

The AP 114 then selects a valid channel configuration formed by one or more component channels that are determined to be idle, and transmits one or more data units to one or more client stations 154 in the selected communication channel with a valid channel configuration or triggers transmission of one or more data units by one or more client stations 154 to the AP 114 in in the selected communication channel with the valid channel configuration. For example, in an embodiment, if the AP 114 determines that component channels 410-1, 410-2, 410-5 and 410-6 are idle, then the AP selects the corresponding 40+40 MHz communication channel, and transmits one or more data units to one or more client stations 154 in the selected 40+40 MHz communication channel or triggers transmission of one or more data units by one or more client stations 154 to the AP 114 in the selected 40+40 MHz communication channel.

In an embodiment, the one or more data unit transmitted by or triggered for transmission to the AP 114 include one or more of a multi user (MU) MIMO data unit, a single user (SU) data unit and/or an OFDMA data unit. The AP 114 is configured to perform or trigger transmission of an MU MIMO data unit, an SU data unit or an OFDMA data unit to/by client stations 154 that are operating with STA operating channels that include at least one primary channel of the AP 114. Transmissions to/by a client station 154 that is operating with an STA operating channel that does not include any primary channel of the AP 114 are restricted to only OFDMA transmissions, in an embodiment. In another embodiment, the AP 114 is configured to also perform SU transmissions to a client station 154 that is operating with an STA operating channel that does not include any primary channel of the AP 114. To enable the AP 114 transmit an SU data unit in one or more component channels that do not include a primary channel of the operation channel of the AP 114, the AP 114 is configured to maintain one or more NAV timers corresponding to one or more primary channels of the AP 114 as described above, and to also maintain a respective backoff timer (e.g., a respective EDCA timer) for each of the component channels of the operating channel of the AP 114. The AP 114 is configured to determine based on the one or more NAV timers and the respective EDCA timers corresponding to the one or more component channels in which the SU data unit is to be transmitted to the client station 154, where the one or more component channels to do include any primary channel of the operating channel of the AP 114, to determine when the one or more component channels are idle. For example, determination of whether the one or more component channels are idle is performed according to the CCA procedure described above. When the AP 114 determines that the one or more component channels in which the SU data unit is to be transmitted to the client station 154 are idle, the AP 114 transmits an SU data unit to the client station 154 in the one or more component channels that do not include any primary channel of the AP 114.

In some embodiments, the AP 114 is configured to use "channel puncture" by transmitting a data unit using non-contiguous idle component channels of a same channel segment, for example. As an example, if the AP 114 determines that the component channels 410-1, 410-2 and 410-4 are idle while the component channel 410-3 is busy, the AP 114 transmits at least one data unit that span the component channels 410-1, 410-2 and 410-4, with the component channel 410-3 being "punctured" from the data units. In some such scenarios, if the data unit is an SU data unit, the data unit can be transmitted if the receiving communication device (e.g., the client station 154-1) supports channel puncture, in an embodiment. Similarly, if the data unit is an OFDMA data unit, then the AP 114 can allocate an RU that is split between non-contiguous component channels to a particular client station 154 (e.g., the client station 154-1) if the particular client station 154 supports channel puncture, in an embodiment.

In an embodiment in which a client station 154 is operating with an operating channel that does not span any primary channel of the AP 114, the client station 154 is not permitted to initiate transmissions to the AP 114 without being scheduled by the AP 114 for uplink transmission to the AP 114. For example, such client station 154 is not permitted to access its operating channel using a CCA procedure such as, for example, a DCA or an EDCA procedure. In an embodiment, such client station 154 is not permitted to initiate transmissions to the AP 114 without first receiving a trigger data unit from the AP 114.

In another embodiment in which a client station 154 is operating with an operating channel that does not span any primary channel of the AP 114, the client station 154 is allowed to transmit an SU data unit to the AP 114. In an embodiment, such client station 154 is configured to perform a CCA procedure such as a DCA or EDCA procedure to access at least a portion of its operating channel for SU transmission to the AP 114. In an embodiment, the AP 114 is not configured to receive a transmission in a portion of the AP operating channel, for example in situation when the AP 114 is transmitting in another portion of the AP operating channel or is receiving another transmission in another portion of the AP operating channel. Accordingly, in this embodiment, the AP 114 will not receive the SU data unit transmitted by the client station 154 to the AP 114 in such situations. In this case, the AP 114 will not transmit a positive acknowledgement of the SU data unit to the client station 154. The client station 154 will assume that the AP 114 did not receive the SU data unit due to a collision, and will initiate a failure recovery procedure to re-transmit the SU data unit, in an embodiment.

In an embodiment, when a client station 154 that is operating with an operating channel that does not span any primary channel of the AP 114 receives a trigger data unit from the AP 114, the client station 154 performs a CCA procedure to determine whether one or more component channel of the operating channel of the client station 154 that include RU(s) allocated for transmission by the client station 154 (e.g., as indicated in the trigger data unit) are idle. In an embodiment in which the operating channel of the client station 154 includes an STA primary channel, the client station 154 utilizes the STA primary channel as the primary channel in the CCA procedure. In another embodiment, in which the operating channel of the client station 154 does not include an STA primary channel, the client stations 154 utilizes any component channel of the operating channel of the client station 154 as the primary channel for the CCA procedure. For example, the client station 154 selects a component channel of the operating channel of the client station 154 to be used as the primary channel for the CCA procedure. The client station 154 maintains a NAV timer based on the designated STA primary channel or the selected primary channel. When the client station 154 receives a trigger data unit from the AP 114, the client station 154 determines that one or more component channels of the operating channel of the client station 154 that include RU(s) are idle if the value of the NAV timer is zero and if the client station 154 has not detected any transmissions in the one or more component channels during a predetermined time period prior to the scheduled transmission by the client station 154. In this case, the client station 154 performs its scheduled transmission. On the other hand, if the value of the NAV timer is not zero or if the client station 154 detected a transmission in the one or more component channels during the predetermined time period prior to the scheduled transmission by the client station 154, then the client station 154 refrains from performing its scheduled transmission, in an embodiment. In an embodiment, the predetermined time period corresponds to SIFS. In another embodiment, the predetermined time period corresponds to PIFS. In another embodiment, another suitable time period is utilized.

In another embodiment in which a client station 154 is operating with an operating channel that does not span any primary channel of the AP 114, the client station 154 does not maintain a NAV timer. In an embodiment, when such client station 154 receives a trigger data unit from the AP 114 that requires the client station 154 to perform a CCA procedure, the client station 154 relies on physical CCA to determine whether one or more component channel of the operating channel of the client station 154 that include RU(s) allocated for transmission by the client station 154 (e.g., as indicated in the trigger data unit) are idle. For example, if the client station 154 has not detected any transmissions in the one or more component channels during a predetermined time period prior to the scheduled transmission by the client station 154, then the client station 154 determines that the one or more component channels are idle and performs the scheduled transmission. On the other hand, if the client station 154 detected a transmission in the one or more component channels during the predetermined time period prior to the scheduled transmission by the client station 154, then the client station 154 determines that the one or more component channels are busy and refrains from performing its scheduled transmission, in an embodiment. In an embodiment, the predetermined time period correspond to a short inter-frame space (SIFS). In another embodiment, another suitable predetermined time period is utilized.

In an embodiment in which a client station 154 is operating with an STA operating channel that spans the entire operating channel of the AP 114, the client station 154 is configured to maintain one or more NAV timers corresponding to the one or more primary channel of the AP 114 and to set, update, reset and utilize the respective NAV timers in the same or similar manner as described above with respect to the AP 114. In another embodiment, the client station 154 that is operating with an STA operating channel that spans the entire operating channel of the AP 114 is not configured to maintain only a single NAV timer and to utilize only the single NAV timer as defined by the second communication protocol (e.g., the IEEE 802.11ax Standard) even if the operating channel of the AP 114 includes multiple primary channels. For example, the client station 154 maintains the single NAV timer based on one of the multiple primary channels of the operating channel of the AP 114, in an embodiment.

In an embodiment in which a client station 154 is operating with an STA operating channel that spans the entire operating channel of the AP 114, the client station 154 is configured to perform a virtual and physical CCA procedure the same as or similar to the virtual and physical CCA procedure described above with respect to the AP 114 to dynamically select, for transmission by the client station 154, at least a portion of the STA operating channel with a valid channel configuration formed by one or more component channels that are determined to be idle. In an embodiment, the client station 154 is not permitted to transmit, in the selected channel configuration, an MU data unit that includes transmissions to multiple communication devices in a single PPDU. In another embodiment in which a client station 154 is operating with an STA operating channel that spans the entire operating channel of the AP 114, the client station 154 is configured to perform a virtual and physical CCA procedure as defined by the second communication protocol (e.g., the IEEE 802.11ax Standard).

Figure 6:
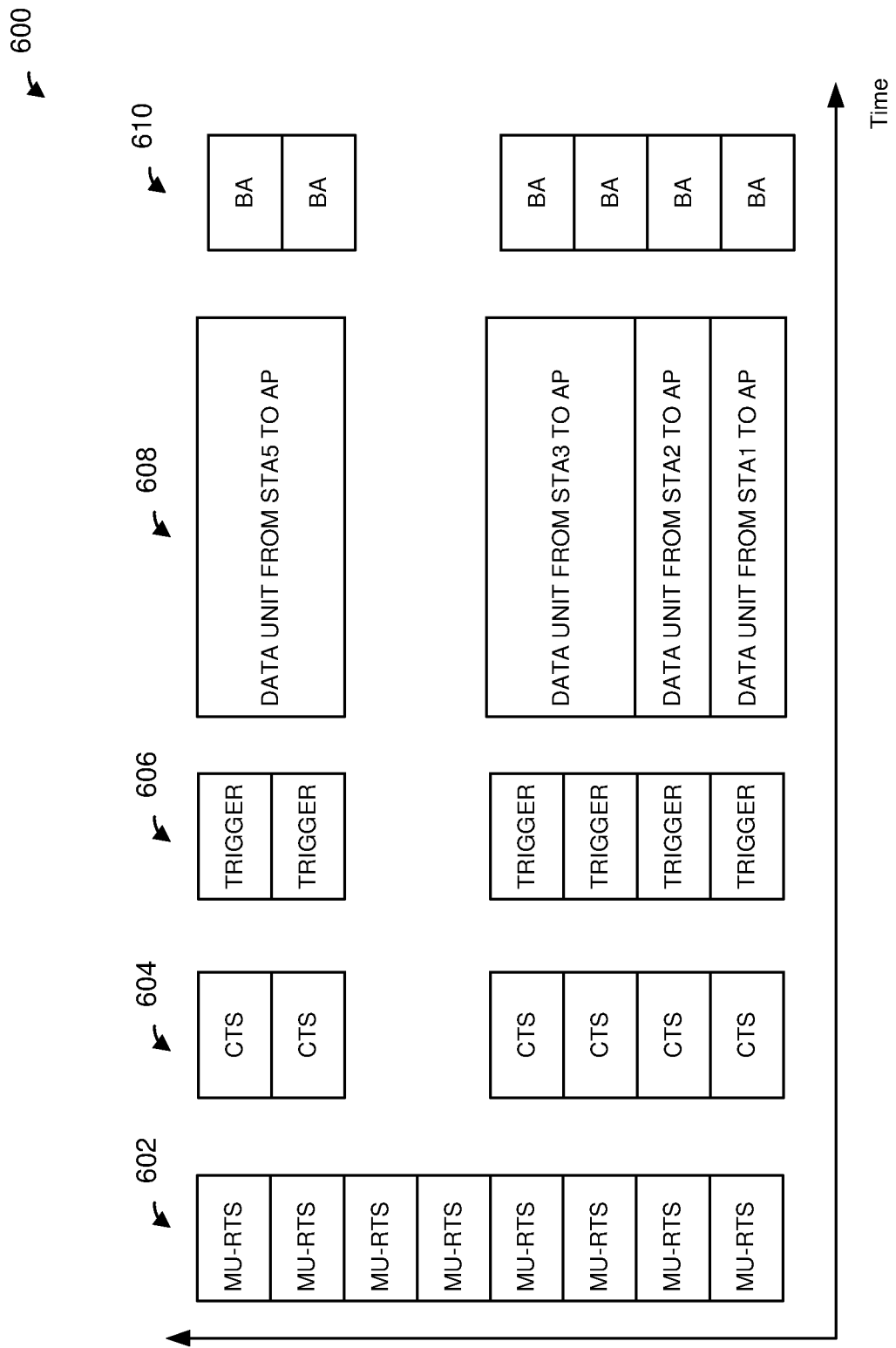
FIG. 6 is a block diagram of a frame exchange that utilizes a channel protection mechanism, according to an embodiment.

FIG. 6 is a block diagram of a frame exchange 600 between the AP 114 and multiple client stations 154, according to an embodiment. The AP 114 generates and transmits a multi-user request-to-send (MU-RTS) frame 602 to multiple of client stations 154 to solicit a clear-to-send (CTS) response from the multiple client stations 154. The MU-RTS frame 602 is duplicated in each component channel of the operating channel of the AP 114. The content of the each duplicate portion of the MU-RTS frame 602 is not necessary identical, as described in more detail below, in some embodiments. In other embodiments, the duplicate portions of the MU-RTS frame 602 are identical.

The MU-RTS frame 602 includes RU allocation information to indicate to respective ones of the multiple client stations 154 RUs for which CTS is being solicited from the respective client stations 154, in an embodiment. In an embodiment, the client stations 154 include at least one client station 154 (e.g., STA3) that is operating with an operating channel that does not include any primary channel of the AP 114. In an embodiment, the AP 114 allocates, to STA3, one or more RUs in the operating channel of STA3 that does not include any primary channel of the operating channel of the AP 114. The AP 114 includes allocation information for STA3 in the MU-RTS frame in one or more component channels of the operating channel of STA3, in an embodiment. For example, if the operating channel of STA3 spans multiple component channels and one of the multiple component channels is designated as an STA primary channel of the operating channel of STA3, then the AP 114 includes the RU allocation information for STA3 in the portion of the MU-RTS frame 602 transmitted in the STA primary channel of the operating channel of STA3. As another example, if the operating channel of STA3 spans multiple component channels no component channel is designated as an STA primary channel of the operating channel of STA3, then the AP 114 includes the RU allocation information for STA3 in the portion of the MU-RTS frame 602 transmitted in each of the multiple component channels spun by the operating channel of STA3. The AP 114 also includes RU allocation information for other client stations 154 (e.g., STA1, STA2, STA4, STA5) at least in the portions of the MU-RTS frame 602 that correspond to one or more primary channels of the AP 114. In another embodiment, content of the MU-RTS frame 602 is the same in every component channel of the operating channel of the AP 114. In this embodiment, the AP 114 includes the RU allocation information for each of the multiple client stations 154 (e.g., STA1, STA2, STA4, STA3, STA5) in every portion of the MU-RTS frame 602 corresponding to every component channel of the operating channel of the AP 114.

In an embodiment, each client stations 154 that receive the MU-RTS frame 602, determine based on allocation information in the MU-RTS frame 602 which one or more of the component channel of the AP 114 are allocated to the client station 154 for transmission of a CTS frame. Then, if the client station 154 determines that the one or more component channels are idle, the client station 154 transmits a CTS frame 604. In an embodiment, the CTS frame 604 transmitted by the client station 154 is duplicated in each of the one or more component channels allocated to the client station 154.

The AP 114 then transmits a trigger frame 606 in the component channels in which the AP 114 received a CTS frame 604 to trigger uplink transmission to the AP 114 by the client stations 154 that responded with a CTS frame 604, in an embodiment. In response to receiving the trigger frame 606 in at least one component channel of the operating channel of a client station 154, the client station 154 transmits ab uplink data unit 608 in the RUs allocated to the client station 154 for uplink transmission to the AP 114. In response, the AP transmits an acknowledgement frame that includes acknowledgement or block acknowledgement information for each client station 154 from which a data unit 608 was successfully received, in an embodiment.

Figure 7:
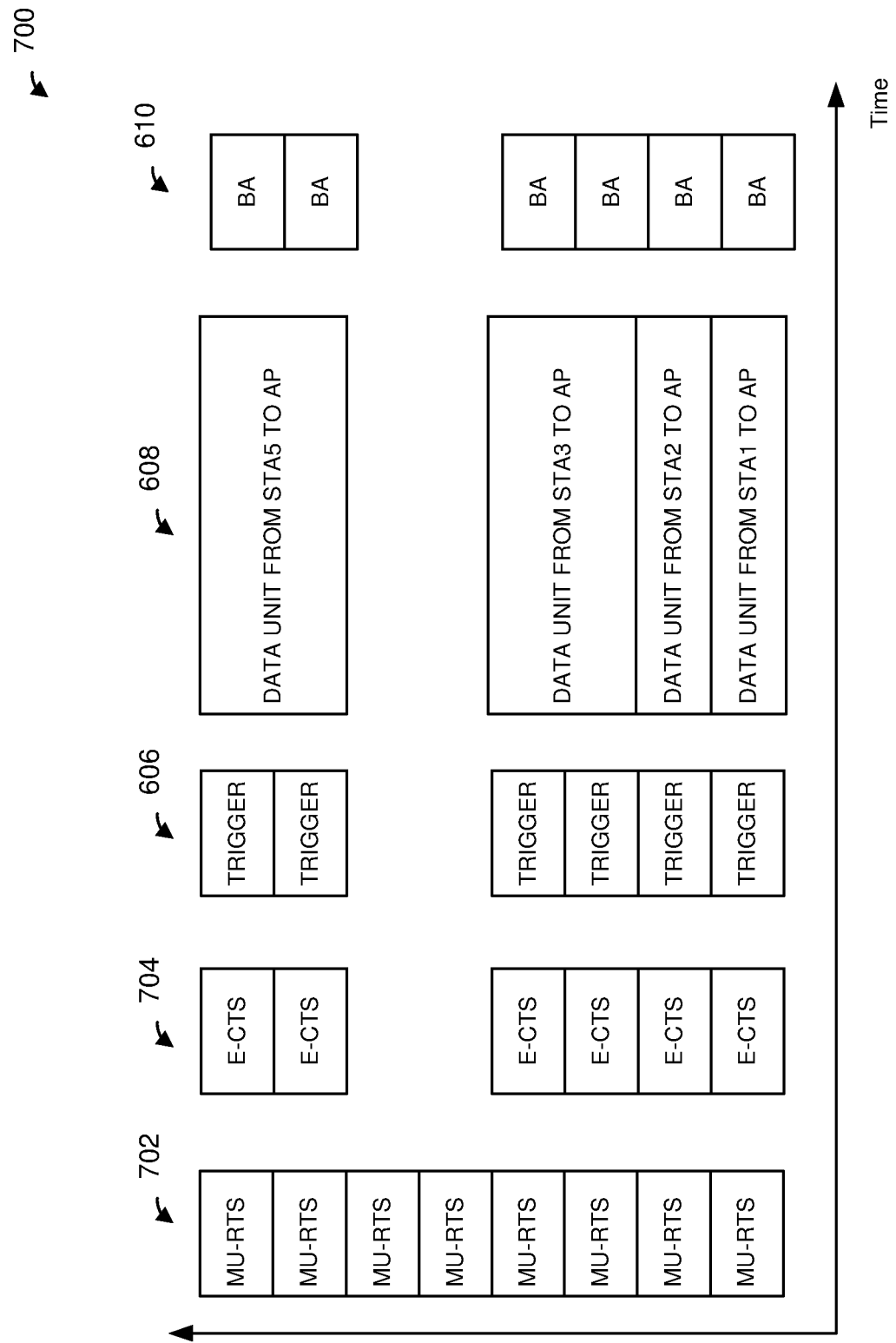
FIG. 7 is a block diagram of a frame exchange that utilizes another channel protection mechanism, according to an embodiment.

FIG. 7 is a block diagram of a frame exchange 700 between the AP 114 and multiple client stations 154, according to another embodiment. The frame exchange 700 is generally the same as the frame exchange 600 of FIG. 6. The AP 114 generates and transmits an MU-RTS frame 702 to multiple of client stations 154 to solicit a clear-to-send (CTS) response from the multiple client stations 154. The MU-RTS frame 702 is generally the same as the MU-RTS frame 602 of the frame exchange 600 of FIG. 6 except that the MU-RTS frame 702 includes an indication that the client stations 154 are requested to transmit available channel report in the CTS response. For example, a bit that is reserved in the MU-RTS frame 602 of the frame exchange 600 is set in the MU-RTS frame 702 to a value (e.g., a logic one or a logic zero) that indicates that the client stations 154 are requested to transmit available channel report in the CTS response. In response to the MU-RTS frame 602, at least some of the client stations 154 solicited by the MU-RTS frame 602 transmit respective extended CTS (E-CTS) frames 704 to the AP 114, in an embodiment. The E-CTS frames 704 is generally the same as the CTS frames 604 of the frame exchange 600 of FIG. 6 except that the E-CTS frames 704 includes an available channel report, such as an available channels bitmap, to indicate whether respective ones of one or more component channels of the operating channel of the client station 154 are available for transmission to/by the client station 154. In an embodiment, the format of the E-CTS frames 704 corresponds to a format of the CTS frames 604 of the frame exchange 600 of FIG. 6, with the available channel report included in a service field of the format of the CTS frames 604 of the frame exchange 600 of FIG. 6. In another embodiment, the format of the E-CTS frames 704 is different from a format of the CTS frames 604 of the frame exchange 600 of FIG. 6.

Figure 8:
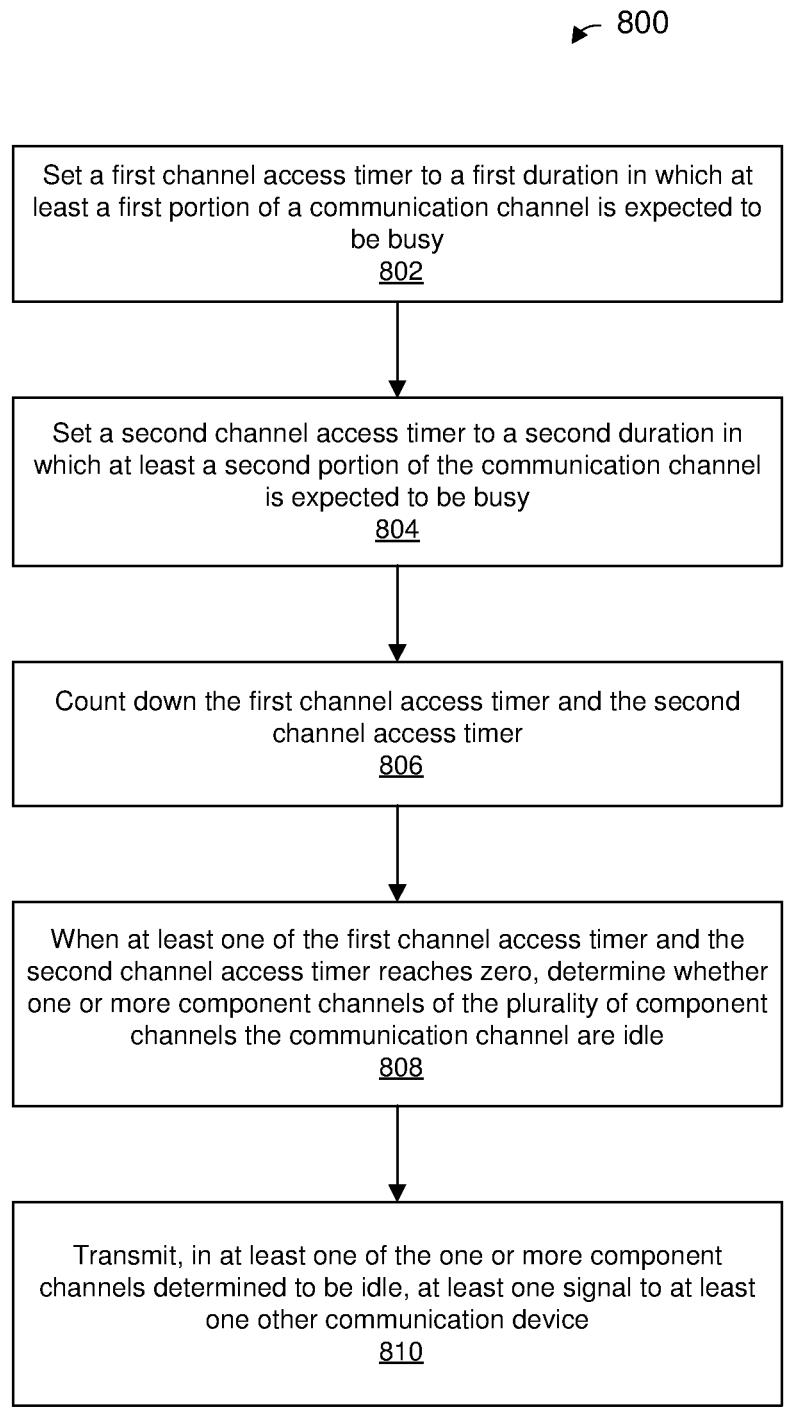
FIG. 8 is a flow diagram of an example method for protection transmissions in a communication channel, according to an embodiment.

FIG. 8 is a flow diagram of an example method 800 for protecting transmissions in a communication channel, according to an embodiment. In some embodiments, the AP

114 of FIG. 1 is configured to implement the method 800. In an embodiment, the method 800 is implemented by the AP 114 by utilizing the system architecture 300 of FIG. 3A or the system architecture or the system architecture 350 of FIG. 3B. In an embodiment, the method 800 is performed by the AP 114 for protecting an aggregate communication channel such as the operating channel 400 of FIG. 4A or the operating channel 450 of FIG. 4B. In other embodiments, the method 800 is implemented by another suitable device of the WLAN 110 of FIG. 1 or by a communication device operating in a suitable network different from the WLAN 110 of FIG. 1.

At block 802, a first channel access timer to is set to a first duration in which at least a first portion of the communication channel is expected to be busy. In an embodiment a first NAV timer is set. In another embodiment, a suitable first channel access timer different from a NAV timer is set. In an embodiment, the first channel access timer corresponds to a first component channel of a plurality of component channels of the communication channel. For example, the first NAV timer corresponds or a first primary channel of the communication channel that includes multiple primary channels, in an embodiment.

At block 804, a second channel access timer is set to a second duration in which at least a second portion of the communication channel is expected to be busy. In an embodiment a second NAV timer is set. In another embodiment, a suitable second channel access timer different from a NAV timer is set. In an embodiment, the second channel access timer corresponds to a second component channel of the plurality of component channels of the communication channel. For example, the second NAV timer corresponds or a second primary channel of the communication channel that includes multiple primary channels, in an embodiment.

At block 806, counting down of the first channel access timer and the second channel access timer is performed.

At block 808, when at least one of the first channel access timer and the second channel access timer reaches zero, it is determined whether one or more component channels of the plurality of component channels the communication channel are idle. For example, respective CCA backoff procedures are performed as described above in order to identify one or more component channels that are idle in accordance with the CCA backoff procedure, in an embodiment. In other embodiments, other suitable techniques for assessing component channels are utilized.

At block 810, in response to determining at block 808 one or more component channels to be idle, at least one signal is transmitted, in at least one of the one or more component channels determined to be idle at block 808, to at least one other communication device. For example, one or more data units (e.g., PPDUs) are transmitted to the at least other communication devices. In an embodiment, multiple component channels that are determined to be idle at block 808 are selected for transmission at block 810, and the at least one signal is transmitted in the multiple selected component channels. In an embodiment, selection of the multiple component channels is performed based on valid channel configuration channels supported by a communication protocol (e.g., the first communication protocol) such that the multiple selected component channels for a valid channel configuration.

In an embodiment, a method for protecting transmissions in a communication channel includes: setting, at a communication device, a first channel access timer to a first duration in which at least a first portion of the communication channel is expected to be busy, wherein the first channel access timer corresponds to a first component channel of a plurality of component channels of the communication channel; setting, at the communication device, a second channel access timer to a second duration in which at least a second portion of the communication channel is expected to be busy, wherein the second channel access timer corresponds to a second component channel of the plurality of component channels of the communication channel; counting down, with the communication device, the first channel access timer and the second channel access timer; and when at least one of the first channel access timer and the second channel access timer reaches zero, determining, with the communication device, whether one or more component channels of the plurality of component channels the communication channel are idle; and in response to determining one or more component channels to be idle, transmitting, with the communication device in at least one of the one or more component channels determined to be idle, at least one signal to at least one other communication device.

In other embodiments, the method includes one of, or any suitable combination of two or more of, the following features.

The first component channel of the communication channel is designated as a first primary channel of the communication channel.

The second component channel of the communication channel is designated as a second primary channel of the communication channel.

Setting the first channel access timer and setting the second channel access timer comprises setting the first channel access timer and setting the second channel access timer to a duration indicated in a same data unit detected in one or both of the fist component channel and the second component channel of the communication channel.

Setting the first channel access timer comprises setting the first channel access timer to a first duration indicated in a first data unit detected in the first component channel.

Setting the second channel access timer comprises setting the second channel access timer to a second duration indicated in a second data unit, different from the first data unit, detected in the second component channel.

The method further includes setting, with the communication device, a first bandwidth state associated with the first channel access timer, to a bandwidth of the first data unit, wherein the first bandwidth state indicates a bandwidth of the at least the first portion of the communication channel that is expected to be busy.

The method further includes: before the first channel access timer reaches zero, detecting, with the communication device, a third data unit in the first component channel; determining, with the communication device based at least in part on a bandwidth of the third data unit and the first bandwidth state associated with the first channel access timer, whether the first bandwidth state should be updated to indicate the bandwidth of the third data unit; and in response to determining that the first bandwidth state should be updated, updating, with the communication device, the first bandwidth state to indicate the bandwidth of the third data unit.

Determining whether one or more component channels of the plurality of component channels of the communication channel are idle includes performing respective clear channel assessment (CCA) backoff procedures in each of the plurality of the component channels.

Determining whether one or more component channels of the plurality of component channels of the communication channel are idle includes determining whether a component channel of the one or more component channels corresponds to a portion of the commutation channel associated with a non-zero value of at least one of the first channel access timer and the second channel access timer.

The method further further includes selecting, with the communication device based on valid channel configurations supported by the communication device, multiple component channels of the one or more component channels determined to be idle such that the selected multiple component channels form a valid channel configuration supported by the communication device, and wherein transmitting at least one signal to at least one other communication device comprises transmitting the at least one signal in the selected multiple component channels.

The communication channel is an aggregate communication channel that includes a first channel segment aggregated with a second channel segment.

The communication device includes respective physical layer (PHY) processing units configured to operate in respective channel segments of the multiple channel segments and a single media access control (MAC) processing unit configured to control operation in the multiple channel segments.

In another embodiment, a communication device comprises: a network interface device implemented on one or more integrated circuits configured to set a first channel access timer to a first duration in which at least a first portion of a communication channel is expected to be busy, wherein the first channel access timer corresponds to a first component channel of a plurality of component channels of the communication channel; set a second channel access timer to a second duration in which at least a second portion of the communication channel is expected to be busy, wherein the second channel access timer corresponds to a second component channel of the plurality of component channels of the communication channel; count down the first channel access timer and the second channel access timer; when at least one of the first channel access timer and the second channel access timer reaches zero, determine whether one or more component channels of the plurality of component channels the communication channel are idle; and in response to determining one or more component channels to be idle, cause at least one signal to be transmitted, in at least one of the one or more component channels determined to be idle, to at least one other communication device.

In other embodiments, the communication device includes one of, or any suitable combination of two or more of, the following features.

The first component channel of the communication channel is designated as a first primary channel of the communication channel.

The second component channel of the communication channel is designated as a second primary channel of the communication channel.

The one or more integrated circuits are configured to set the first channel access timer and set the second channel access timer to a duration indicated in a same data unit detected in one or both of the fist component channel and the second component channel of the communication channel.

The one or more integrated circuits are configured to set the first channel access timer to a first duration indicated in a first data unit detected in the first component channel.

The one or more integrated circuits are configured to set the second channel access timer to a second duration indicated in a second data unit, different from the first data unit, detected in the second component channel.

The one or more integrated circuits are further configured to set, to a bandwidth of the first data unit, a first bandwidth state associated with the first channel access timer, wherein the first bandwidth state indicates a bandwidth of the at least the first portion of the communication channel that is expected to be busy.

The one or more integrated circuits are further configured to: before the first channel access timer reaches zero, detect a third data unit in the first component channel, determine, based at least in part on a bandwidth of the third data unit and the first bandwidth state associated with the first channel access timer, whether the first bandwidth state should be updated to indicate the bandwidth of the third data unit, and in response to determining that the first bandwidth state should be updated, update the first bandwidth state to indicate the bandwidth of the third data unit.

The one or more integrated circuits are configured to determine whether one or more component channels of the plurality of component channels of the communication channel are idle at least by performing respective clear channel assessment (CCA) backoff procedures in each of the plurality of the component channels.

The one or more integrated circuits are configured to determine whether one or more component channels of the plurality of component channels of the communication channel are idle at least by determining whether a component channel of the one or more component channels corresponds to a portion of the commutation channel associated with a non-zero value of at least one of the first channel access timer and the second channel access timer.

The one or more integrated circuits are further configured to select, based on valid channel configurations supported by the communication device, multiple component channels of the one or more component channels determined to be idle such that the selected multiple component channels form a valid channel configuration supported by the communication device, and transmit at least one signal to at least one other communication device comprises transmitting the at least one signal in the selected multiple component channels.

The communication channel is an aggregate communication channel that includes a first channel segment aggregated with a second channel segment.

The network interface device comprises respective physical layer (PHY) processing units, implemented on the one or more integrated circuits, configured to operate in respective channel segments of the multiple channel segments and a single media access control (MAC) processing unit, implemented on the one or more integrated circuits, configured to control operation in the multiple channel segments.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for protecting transmissions in a communication channel, the method comprising:
setting, at a communication device, a first channel access timer to a first duration in which at least a first portion of the communication channel is expected to be busy,
wherein the first channel access timer corresponds to a first component channel of a plurality of component channels of the communication channel;
setting, at the communication device, a second channel access timer to a second duration in which at least a second portion of the communication channel is expected to be busy,
wherein the second channel access timer corresponds to a second component channel of the plurality of component channels of the communication channel;
counting down, with the communication device, the first channel access timer and the second channel access timer ;
when at least one of the first channel access timer and the second channel access timer reaches zero,
determining, with the communication device, whether one or more component channels of the plurality of component channels the communication channel are idle;
and
in response to determining one or more component channels to be idle,
transmitting, with the communication device in at least one of the one or more component channels determined to be idle, at least one signal to at least one other communication device;
setting the first channel access timer to the first duration indicated in a first data unit detected in one or both of the first component channel and the second component channel;
setting the second channel access timer to the second duration indicated in a second data unit detected in one or both of the first component channel and the second component channel;
further comprising setting, with the communication device, a first bandwidth state associated with the first channel access timer, to a bandwidth of the first data unit,
wherein the first bandwidth state indicates a bandwidth of the at least the first portion of the communication channel that is expected to be busy;
before the first channel access timer reaches zero, detecting, with the communication device, a third data unit in the first component channel;
determining, with the communication device based at least in part on a bandwidth of the third data unit and the first bandwidth state associated with the first channel access timer, whether the first bandwidth state should be updated to indicate the bandwidth of the third data unit and
in response to determining that the first bandwidth state should be updated, updating, with the communication device, the first bandwidth state to indicate the bandwidth of the third data unit.

2. The method of claim 1, wherein
the first component channel of the communication channel is designated as a first primary channel of the communication channel, and
the second component channel of the communication channel is designated as a second primary channel of the communication channel.

3. The method of claim 1,
wherein the first and second data units are included in a same data unit detected in the one or both of the first component channel and the second component channel of the communication channel.

4. The method of claim 1, wherein
the first data unit is detected in the first component channel, and
the second data unit, is different from the first data unit, and is detected in the second component channel.

5. The method of claim 1,
wherein determining whether one or more component channels of the plurality of component channels of the communication channel are idle includes performing respective clear channel assessment (CCA) backoff procedures in each of the plurality of the component channels.

6. The method of claim 1,
wherein determining whether one or more component channels of the plurality of component channels of the communication channel are idle includes determining whether a component channel of the one or more component channels corresponds to a portion of the communication channel associated with a non-zero value of at least one of the first channel access timer and the second channel access timer.

7. The method of claim 1,
further comprising selecting, with the communication device based on valid channel configurations supported by the communication device, multiple component channels of the one or more component channels determined to be idle such that the selected multiple component channels form a valid channel configuration supported by the communication device, and
wherein transmitting at least one signal to at least one other communication device comprises transmitting the at least one signal in the selected multiple component channels.

8. The method of claim 1, wherein
the communication channel is an aggregate communication channel that includes a first channel segment aggregated with a second channel segment, and
the communication device includes respective physical layer (PHY) processing units configured to operate in respective channel segments of the multiple channel segments and a single media access control (MAC) processing unit configured to control operation in the multiple channel segments.

9. A communication device, comprising:
a network interface device implemented on one or more integrated circuits configured to set a first channel access timer to a first duration in which at least a first portion of
a communication channel is expected to be busy,
wherein the first channel access timer corresponds to a first component channel of a plurality of component channels of the communication channel;

set a second channel access timer to a second duration in which at least a second portion of the communication channel is expected to be busy,
wherein the second channel access timer corresponds to a second component channel of the plurality of component channels of the communication channel;
count down the first channel access timer and the second channel access timer ;
when at least one of the first channel access timer and the second channel access timer reaches zero,
determine whether one or more component channels of the plurality of component channels the communication channel are idle; and
in response to determining one or more component channels to be idle,
cause at least one signal to be transmitted, in at least one of the one or more component channels determined to be idle, to at least one other communication device;
wherein the one or more integrated circuits are further configured to
set the first channel access timer to the first duration indicated in a first data unit detected in one or both of the first component channel and the second component channel;
set the second channel access timer to the second duration indicated in a second data unit detected in one or both of the first component channel and the second component channel;
wherein the one or more integrated circuits are further configured to set, to a bandwidth of the first data unit, a first bandwidth state associated with the first channel access timer;
wherein the first bandwidth state indicates a bandwidth of the at least the first portion of the communication channel that is expected to be busy; and
wherein the one or more integrated circuits are further configured to,
before the first channel access timer reaches zero, detect a third data unit in the first component channel,
determine, based at least in part on a bandwidth of the third data unit and the first bandwidth state associated with the first channel access timer , whether the first bandwidth state should be updated to indicate the bandwidth of the third data unit, and
in response to determining that the first bandwidth state should be updated, update the first bandwidth state to indicate the bandwidth of the third data unit.

10. The communication device of claim 9, wherein
the first component channel of the communication channel is designated as a first primary channel of the communication channel, and
the second component channel of the communication channel is designated as a second primary channel of the communication channel.

11. The communication device of claim 9,
wherein the first and second data units are included in a same data unit detected in the one or both of the first component channel and the second component channel of the communication channel.

12. The communication device of claim 9, wherein
the first data unit detected in the first component channel, and
the second data unit, is different from the first data unit, and is detected in the second component channel.

13. The communication device of claim 9,
wherein the one or more integrated circuits are configured to determine whether one or more component channels of the plurality of component channels of the communication channel are idle at least by performing respective clear channel assessment (CCA) backoff procedures in each of the plurality of the component channels.

14. The communication device of claim 9,
wherein the one or more integrated circuits are configured to determine whether one or more component channels of the plurality of component channels of the communication channel are idle at least by determining whether a component channel of the one or more component channels corresponds to a portion of the communication channel associated with a non-zero value of at least one of the first channel access timer and the second channel access timer.

15. The communication device of claim 9, wherein the one or more integrated circuits are further configured to
select, based on valid channel configurations supported by the communication device, multiple component channels of the one or more component channels determined to be idle such that the selected multiple component channels form a valid channel configuration supported by the communication device, and
transmit at least one signal to at least one other communication device comprises transmitting the at least one signal in the selected multiple component channels.

16. The communication device of claim 9, wherein
the communication channel is an aggregate communication channel that includes a first channel segment aggregated with a second channel segment, and
the network interface device comprises respective physical layer (PHY) processing units, implemented on the one or more integrated circuits, configured to operate in respective channel segments of the multiple channel segments and a single media access control (MAC) processing unit, implemented on the one or more integrated circuits, configured to control operation in the multiple channel segments.

17. A communication device, comprising:
a network interface device implemented on one or more integrated circuits configured to set a first channel access timer to a first duration in which at least a first portion of
a communication channel is expected to be busy;
wherein the first channel access timer corresponds to a first component channel of a plurality of component channels of the communication channel;
set a second channel access timer to a second duration in which at least a second portion of the communication channel is expected to be busy;
wherein the second channel access timer corresponds to a second component channel of the plurality of component channels of the communication channel;
count down the first channel access timer and the second channel access timer;
when at least one of the first channel access timer and the second channel access timer reaches zero,
determine whether one or more component channels of the plurality of component channels the communication channel are idle; and
in response to determining one or more component channels to be idle, cause at least one signal to be transmitted, in at least one of the one or more component channels determined to be idle, to at least one other communication device;

wherein the one or more integrated circuits are configured to set the first channel access timer to the first duration in a first data unit and set the second channel access timer to the second duration in a second data unit, wherein the first and second data units are included in a same data unit detected in one or both of the first component channel and the second component channel of the communication channel;

wherein the one or more integrated circuits are further configured to set, to a bandwidth of the first data unit, a first bandwidth state associated with the first channel access timer, wherein the first bandwidth state indicates a bandwidth of the at least the first portion of the communication channel that is expected to be busy; and wherein the one or more integrated circuits are further configured to before the first channel access timer reaches zero, detect a third data unit in the first component channel, determine, based at least in part on a bandwidth of the third data unit and the first bandwidth state associated with the first channel access timer , whether the first bandwidth state should be updated to indicate the bandwidth of the third data unit, and in response to determining that the first bandwidth state should be updated, update the first bandwidth state to indicate the bandwidth of the third data unit.

* * * * *